(12) United States Patent
Martin et al.

(10) Patent No.: US 10,379,726 B2
(45) Date of Patent: Aug. 13, 2019

(54) RE-ORDERING PAGES WITHIN AN IMAGE PREVIEW

(71) Applicant: Xerox Corporation, Norwalk, CT (US)

(72) Inventors: Andrew T. Martin, Honeoye Falls, NY (US); Brandon Scott McComber, Webster, NY (US); Ken Hayward, Brockport, NY (US); Shane Jewitt, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 345 days.

(21) Appl. No.: 15/352,918

(22) Filed: Nov. 16, 2016

(65) Prior Publication Data

US 2018/0136810 A1    May 17, 2018

(51) Int. Cl.
*G06F 3/0486* (2013.01)
*G06F 3/0482* (2013.01)
*G06F 3/0484* (2013.01)
*G06F 3/12* (2006.01)

(52) U.S. Cl.
CPC .......... *G06F 3/0486* (2013.01); *G06F 3/0482* (2013.01); *G06F 3/04845* (2013.01); *G06F 3/1204* (2013.01); *G06F 3/125* (2013.01); *G06F 3/1256* (2013.01)

(58) Field of Classification Search
CPC .............................. G06F 3/0486; G06F 3/0482
See application file for complete search history.

(56) References Cited

U.S. PATENT DOCUMENTS

| 5,581,670 | A | 12/1996 | Bier et al. |
| 7,634,725 | B2 | 12/2009 | Nishikawa |
| 7,797,639 | B2 | 9/2010 | Keely et al. |
| 8,972,879 | B2 | 3/2015 | Migos et al. |
| 9,015,582 | B2 | 4/2015 | Kodimer et al. |
| 2007/0192370 | A1 | 8/2007 | Kim et al. |
| 2011/0219297 | A1* | 9/2011 | Oda ................. G06F 17/24 715/246 |
| 2012/0030569 | A1 | 2/2012 | Migos et al. |
| 2012/0079375 | A1* | 3/2012 | Ogino ............... G06T 11/60 715/274 |
| 2012/0166987 | A1 | 6/2012 | Kang et al. |
| 2012/0198384 | A1 | 8/2012 | Kumamoto |
| 2013/0159940 | A1 | 6/2013 | Duffy et al. |
| 2014/0013254 | A1 | 1/2014 | Hosein |

(Continued)

*Primary Examiner* — Roland J Casillas
(74) *Attorney, Agent, or Firm* — Gibb & Riley, LLC

(57) ABSTRACT

Moving a selected thumbnail image parallel to a linear strip of unselected thumbnail images within a preview electronic display, increases spacing between two of the adjacent thumbnail images, when the selected thumbnail image is positioned proximate them. In turn, spacing between other adjacent ones of the unselected thumbnail images returns to the original spacing, when the selected thumbnail image is not positioned proximate them. Methods and systems return the unselected thumbnail images to the original size in response to releasing the selected thumbnail image between two adjacent thumbnail images, within the movable thumbnail electronic display image, and this changes the linear strip of original size thumbnail images of the document pages from an original page order to a different order having the selected thumbnail image in a different location within the linear strip.

20 Claims, 17 Drawing Sheets

(56) References Cited

U.S. PATENT DOCUMENTS

| | | | |
|---|---|---|---|
| 2014/0153014 A1* | 6/2014 | Kaneda | H04N 1/00448 358/1.12 |
| 2014/0157189 A1* | 6/2014 | Morita | G06F 3/0482 715/784 |
| 2016/0188179 A1* | 6/2016 | Roh | G06F 3/0486 715/769 |

* cited by examiner

RE-ORDERING PAGES WITHIN AN IMAGE PREVIEW

BACKGROUND

Systems and methods herein generally relate to reordering document pages within an electronic display.

Traditionally, on resistive screen touch devices employing a page re-ordering capability, methods have involved manually identifying pages to be moved and the target destinations for those pages. This is somewhat abstract and confusing, requiring the user to know pages numbers, etc. If multiple moves are being made, this becomes additionally confusing due to the page renumbering after each move event. In view of this, the methods and devices presented below provide a more intuitive and user-friendly solution for reordering document pages within an electronic display.

SUMMARY

Various methods herein provide (from a processor to a display device) a "print-menu" electronic display image related to printing a document. The document can be a scanned image, a printable document generated by an application, or a printable item retrieved from storage, and generally has document pages in an original page order. The display device includes a user input component (e.g., touch screen, mouse, touchpad, trackball, etc.) interacting with electronic screens displayed on the display device. The print-menu electronic display image has a "preview" menu option, and the methods herein provide (from the processor to the display device) a "movable thumbnail" electronic display image, in response to selection of the preview menu option through the user input component.

The movable thumbnail electronic display image displays a linear strip of original size thumbnail images of the document pages sequentially adjacent one another (potentially numbered) and in original page order, along a dimension (e.g., linear bottom or side) of the display device. Such methods detect operation of the user input component selecting at least one of the thumbnail images of document pages within the movable thumbnail electronic display image (to identify one or more selected thumbnail images). For example, the user can tap, click, point, etc., using any user input, to select one of the thumbnail images. Once one thumbnail image is selected, a second can be selected merely by tapping, clicking, pointing, etc., on another thumbnail image. Thumbnail images can be similarly deselected by tapping, clicking, pointing, etc., a previously selected thumbnail image a second time.

These methods can also highlight the selected thumbnail image within the movable thumbnail electronic display image, relative to other thumbnail images of the document pages, in response to the user selecting one or more of the thumbnail images, by changing appearance of the selected thumbnail image (but, without necessarily altering the size of the selected thumbnail image). Such "highlighting" changes (relative to the other unselected thumbnails) the brightness of the selected thumbnail image (or "grays out" the unselected images by reducing their brightness), the color of the selected thumbnail image, a characteristic (color, brightness, etc.) of the background of the selected thumbnail image, a characteristic (color, brightness, etc.) of the outline (e.g., the border, the edge, etc.) of the selected thumbnail image, etc. Deselecting a thumbnail image removes any such highlighting.

Various other buttons, such as delete, edit, rotate, select all, etc., buttons are displayed within the movable thumbnail electronic display image. Such buttons can be constantly displayed, or can appear or change from reduced brightness (change from "grayed out") to full brightness, in response to selection of one of the thumbnail images. For example, selection of the delete button deletes the selected thumbnail image(s) from the linear strip of thumbnail images, selection of the edit button presents the selected thumbnail image(s) in an edit screen, selection of the rotate button rotates the selected thumbnail image(s) within the linear strip of thumbnail images, selection of the select all button selects all the selected thumbnail images within the linear strip of thumbnail images, etc.

Methods herein further detect operation of the user input component moving the selected thumbnail image in a first direction that is generally perpendicular to (e.g., within 30% perpendicular to) and/or away from, the linear strip of unselected thumbnail images within the movable thumbnail electronic display image (e.g., upward, to the right, to the left, etc.). For example, the user can hold down a button (or keep constant contact with a touch screen) while moving a pointing device (or moving the item being contacted on a touch screen) to execute a "click-and-drag" operation, so as to grab and drag one of the thumbnail images away from the unselected thumbnail images.

If multiple thumbnail images have been selected, the multiple selected thumbnail images are stacked as a single unit of "stacked images" within the movable thumbnail electronic display image, when the selected thumbnail image is moved away from the unselected thumbnail images. Thus, if the user has selected multiple thumbnail images, when the user begins to move one of the selected thumbnail images away from the linear strip of unselected thumbnail images, all selected thumbnail images move in unison away from the linear strip of thumbnail images and smoothly come together as stacked images on the display. The single unit of stacked images thus is separated from the linear strip of unselected thumbnail images after the user moves one of the multiple selected thumbnail images.

Such methods can also reduce the size of the unselected thumbnail images relative to the original size within the movable thumbnail electronic display image, in response to the user moving the selected thumbnail image away from the unselected thumbnail images, but without necessarily altering the size of the selected thumbnail image. Additionally, these methods can move the linear strip of unselected thumbnail images in another direction, opposite the first direction, within the movable thumbnail electronic display image, in response to the user moving the selected thumbnail image away from the unselected thumbnail images to help visually distinguish the selected and moved thumbnail images from the other unselected thumbnail images.

Also, these methods detect operation of the user input component moving the selected thumbnail image (or single unit of stacked images) in a second direction generally parallel to (e.g., within 30% parallel to) the linear strip of thumbnail images within the movable thumbnail electronic display image. The methods increase spacing between two adjacent ones of the unselected thumbnail images, from an original spacing, when the selected thumbnail image (or single unit of stacked images) is positioned proximate the two adjacent thumbnail images, as the user input component moves the selected thumbnail image parallel to the linear strip of thumbnail images. In turn, the methods herein return the spacing between the unselected thumbnail images to the original spacing, when the selected thumbnail image (or stack of thumbnail images) is not positioned proximate the unselected thumbnail images (within the movable thumbnail electronic display image).

In other words, as the user moves the selected thumbnail image (or single unit of stacked images) along the linear strip of unselected thumbnail images, the two unselected thumbnails closest to the selected thumbnail image (or single unit of stacked images) separate from one another (along the second direction), to create a space for the selected thumbnail image (or single unit of stacked images) to be dropped or moved into. Further, as the user continues to move the selected thumbnail image (or single unit of stacked images) along the linear strip of unselected thumbnail images, that pair of unselected separated thumbnail images move back to the original spacing, so that the created space is no longer between that pair of adjacent unselected thumbnail images, but has moved to a different pair of unselected thumbnail images.

Also, these methods can display a linear indicator (e.g., a line, an arrow, etc.) extending from the selected thumbnail image (or single unit of stacked images) to the space between the pair of adjacent unselected thumbnail images (e.g., in a direction generally perpendicular to the linear strip of thumbnail images within the movable thumbnail electronic display image) in response to moving of the selected thumbnail image away from the unselected thumbnail images. This linear indicator identifies where the selected thumbnail image (or single unit of stacked images) will be positioned between the linear strip of unselected thumbnail images, if and when released.

Once the user releases the selected thumbnail image (or single unit of stacked images) by releasing the button (or removing their finger from the touch screen) that was being held in the previously described click-and-drag operation, the selected thumbnail image (or single unit of stacked images) moves in a third direction (opposite the first direction) toward the linear strip of unselected thumbnail images until the selected thumbnail image (or single unit of stacked images) are positioned within the space between the pair of adjacent unselected thumbnail images in the linear strip of unselected thumbnail images.

As the selected thumbnail image moves into the space between the pair of adjacent unselected thumbnail images (after being so released) the linear strip of unselected thumbnail images returns to the original size so that the released thumbnail images moves to be positioned between other similarly-sized thumbnail images within the linear strip of thumbnail images. If multiple thumbnail images had been selected, the unit of stacked images spreads out into individual thumbnail images (and the order of such is maintained from the relative original order, so that a selected thumbnail image with a higher original page number will appear after one with a lower original page number when the unit of stacked images is released and spreads out within the space in the linear strip of thumbnail images). Additionally, at this time, any highlighting is removed from the thumbnail images, so that a newly ordered linear strip of thumbnail images, without any highlighting is presented on the display. Such operations can be repeated as many times as the user desires. Therefore, this changes the linear strip of original size thumbnail images of the document pages from the original page order to a different order having the selected thumbnail image(s) in a different location within the linear strip.

An exemplary apparatus herein includes (among other components) a processor, a display device operatively connected to the processor, etc. The display device includes a user input component interacting with screens displayed on the display device. The processor provides a "print-menu" electronic display image related to printing a document to the display device, and the display device displays the same. The print-menu electronic display image has a "preview" menu option. Such a document includes document pages in an original page order. In response to selection of the preview menu option through the user input component, the processor provides a "movable thumbnail" electronic display image to the display device and the display device displays the same.

The movable thumbnail electronic display image displays a linear strip of original size thumbnail images of the document pages sequentially adjacent one another, in the original page order, along a dimension of the display device (e.g., parallel to an edge of the display device). The user input component can detect selection of at least one of the thumbnail images of document pages within the movable thumbnail electronic display image to identify a selected thumbnail image. In response to this selection, the display device highlights the selected thumbnail image within the movable thumbnail electronic display image relative to unselected thumbnail images of the document pages, by changing the appearance of the selected thumbnail image, without altering the size of the selected thumbnail image.

The user input component also can detect movement of the selected thumbnail image in a first direction generally perpendicular to, and away from, the linear strip of unselected thumbnail images within the movable thumbnail electronic display image. In response to the movement of the selected thumbnail image away from the unselected thumbnail images, the display device reduces the size of the unselected thumbnail images relative to the original size within the movable thumbnail electronic display image, again without altering the size of the selected thumbnail image. As noted above, the display can provide a linear indicator that identifies where the selected thumbnail image (or single unit of stacked images) will be positioned between the linear strip of unselected thumbnail images, if and when released.

Again, if multiple thumbnail images have been selected, the multiple selected thumbnail images are stacked as a single unit as the selected thumbnail images are moved away from the linear strip of unselected thumbnail images. Thus, if the user has selected multiple thumbnail images, when the user begins to move one of the selected thumbnail images away from the linear strip of unselected thumbnail images, all selected thumbnail images move in unison away from the linear strip of unselected thumbnail images and smoothly come together as the stacked images on the display.

Additionally, the user input component can detect movement of the selected thumbnail image in a second direction generally parallel to the linear strip of thumbnail images within the movable thumbnail electronic display image. The display device increases spacing between two adjacent thumbnail images in the linear strip of thumbnail images, from the original spacing, when the selected thumbnail image is positioned proximate the two adjacent thumbnail images (as the user input component detects movement of the selected thumbnail image in the second direction parallel to the linear strip of thumbnail images). Additionally, the display device returns the spacing between other adjacent thumbnail images to the original spacing when the selected thumbnail image is not positioned proximate the other adjacent ones of the unselected thumbnail images, within the movable thumbnail electronic display image.

When the selected thumbnail image is released into the space between the two adjacent thumbnail images, the display device returns the unselected thumbnail images to the original size, and this changes the linear strip of original size thumbnail images of the document pages from the original page order to a different order having the selected thumbnail image in a different location within the linear strip.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, conventional page reordering systems can be somewhat abstract and confusing. In view of this, the methods and devices presented herein provide a more intuitive and user-friendly solution for re-ordering pages within an image preview on, for example, a capacitive touch screen. In these methods and systems, the user views a "film strip" of page images. The user selects the pages they want to move by tapping on corresponding thumbnail images, and as they are tapped, each page is highlighted indicating that it has been selected. The user then holds their finger on one of the selected pages and drags it upward, and all of the selected pages move up together. Once the page group reaches a threshold height above the filmstrip, the selected pages collapse into a single stack and the remaining pages in the filmstrip moves back together to fill in gaps created by the pages being moved. The user then drags the group of pages to be moved to the new location in the filmstrip, which separates to accommodate the group. When released, the page group expands within the filmstrip to individual page images and all pages will be renumbered.

Figure 1:
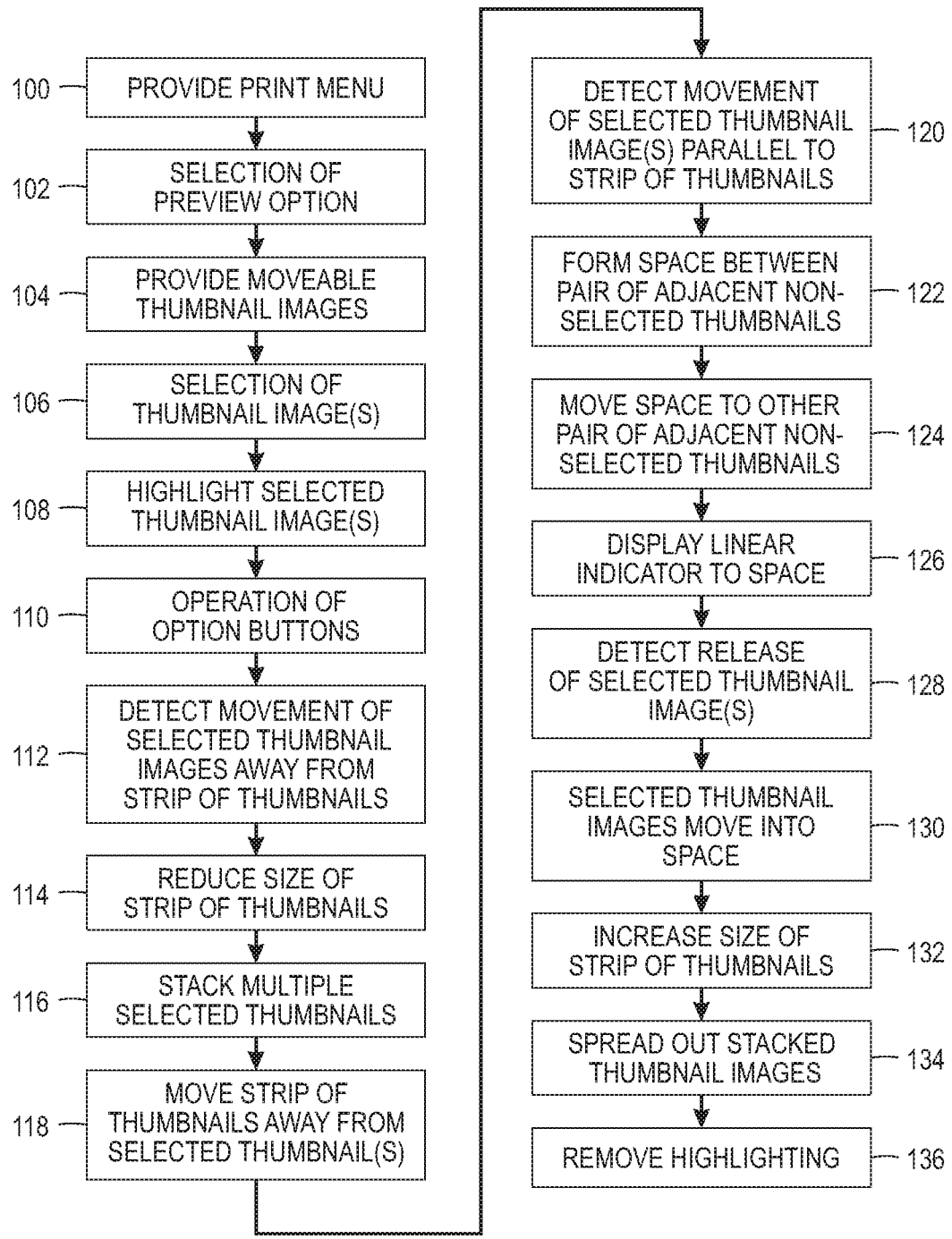
FIG. 1 is a flow diagram of various methods herein.

FIG. 1 is flowchart illustrating exemplary methods herein and is explained in reference to FIGS. 2-15, in the following discussion. These methods provide (from a processor 216, 224 to a display device 212, shown in FIG. 2) a "print-menu" electronic display image 350 related to printing a document, and the display device 212 displays the same, as shown in item 100 in FIG. 1. The display device 212 can be a component of, or connected to, a printer, copier, multi-function device, computer, portable electronic device, etc.; and the document can be a scanned image, a printable document generated by a software application, a printable item retrieved from storage, etc., and generally has document pages in an original page order.

Figure 2:
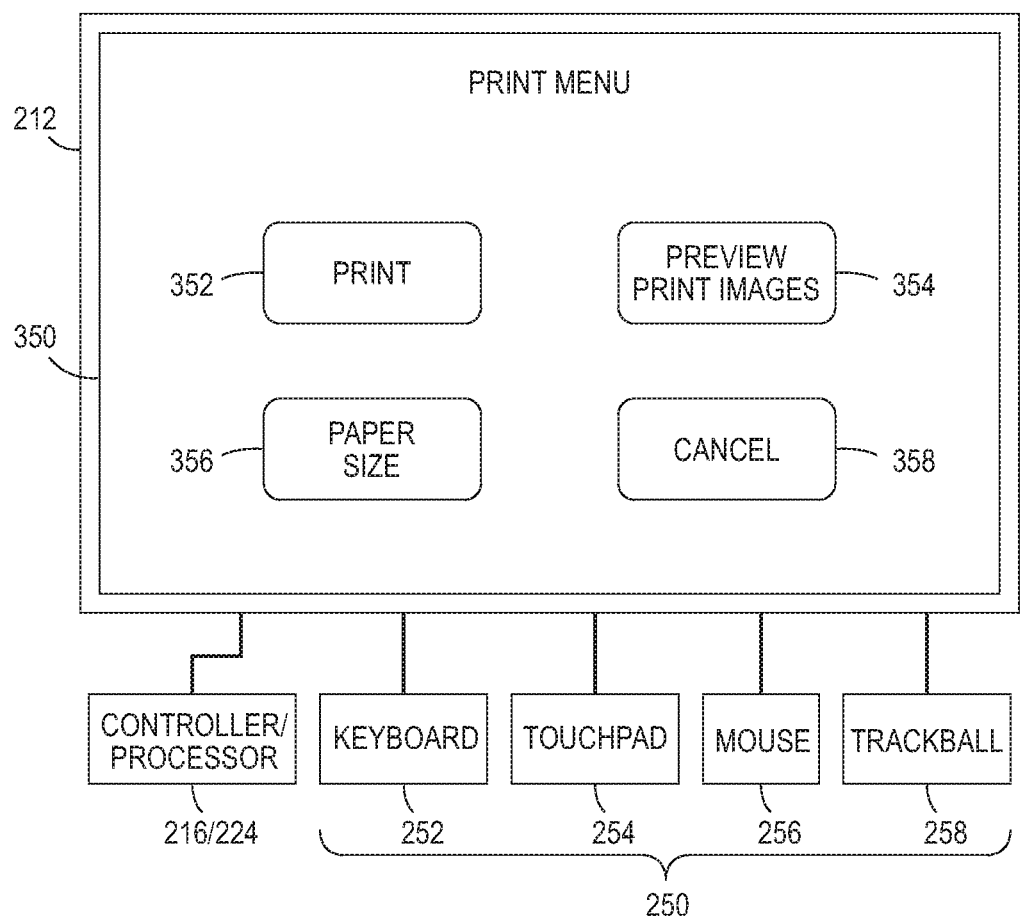
FIG. 2-15 are schematic diagrams illustrating displays herein.

As shown in FIG. 2, the display device 212 includes one or more items that make up a user input component 250 (non-limiting examples of which include, touch screen 212, keyboard 252, touchpad 254, mouse 256, trackball 258, etc., or any similar device) interacting with electronic screens (e.g., 320, 350, shown in FIGS. 2-15) displayed on the display device 212. The print-menu electronic display image 350 can include various menu options including (but not limited to) a "print" menu option 352, a "preview" menu option 354, a "paper size" menu option 356, a "cancel" menu option 358, etc. User selection of the preview menu option 354 (through user input to the user input component 250) is shown as item 102 in FIG. 1.

Figure 3:
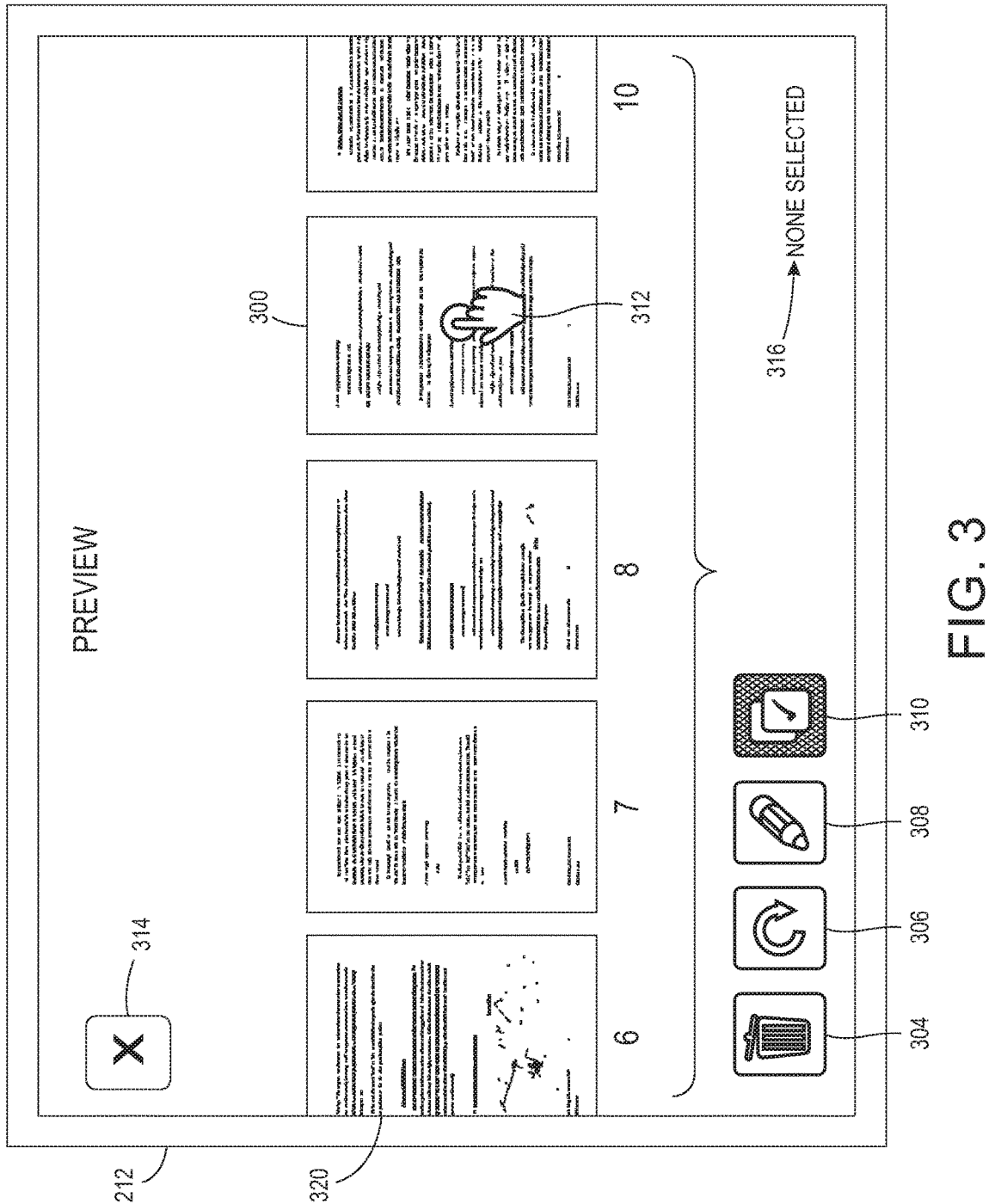

The methods herein provide (from the processor 216, 224 to the display device 212) a "movable thumbnail" electronic display image in item 104 in FIG. 1, in response to selection of the preview menu option 354 in item 102. As shown in FIG. 3, the movable thumbnail electronic display image 320 displays a linear strip of original size thumbnail images 330 of the document pages sequentially adjacent one another (potentially numbered, as shown) and in original page order, along a dimension (e.g., parallel to the linear bottom or side) of the display device 212.

Figure 11:
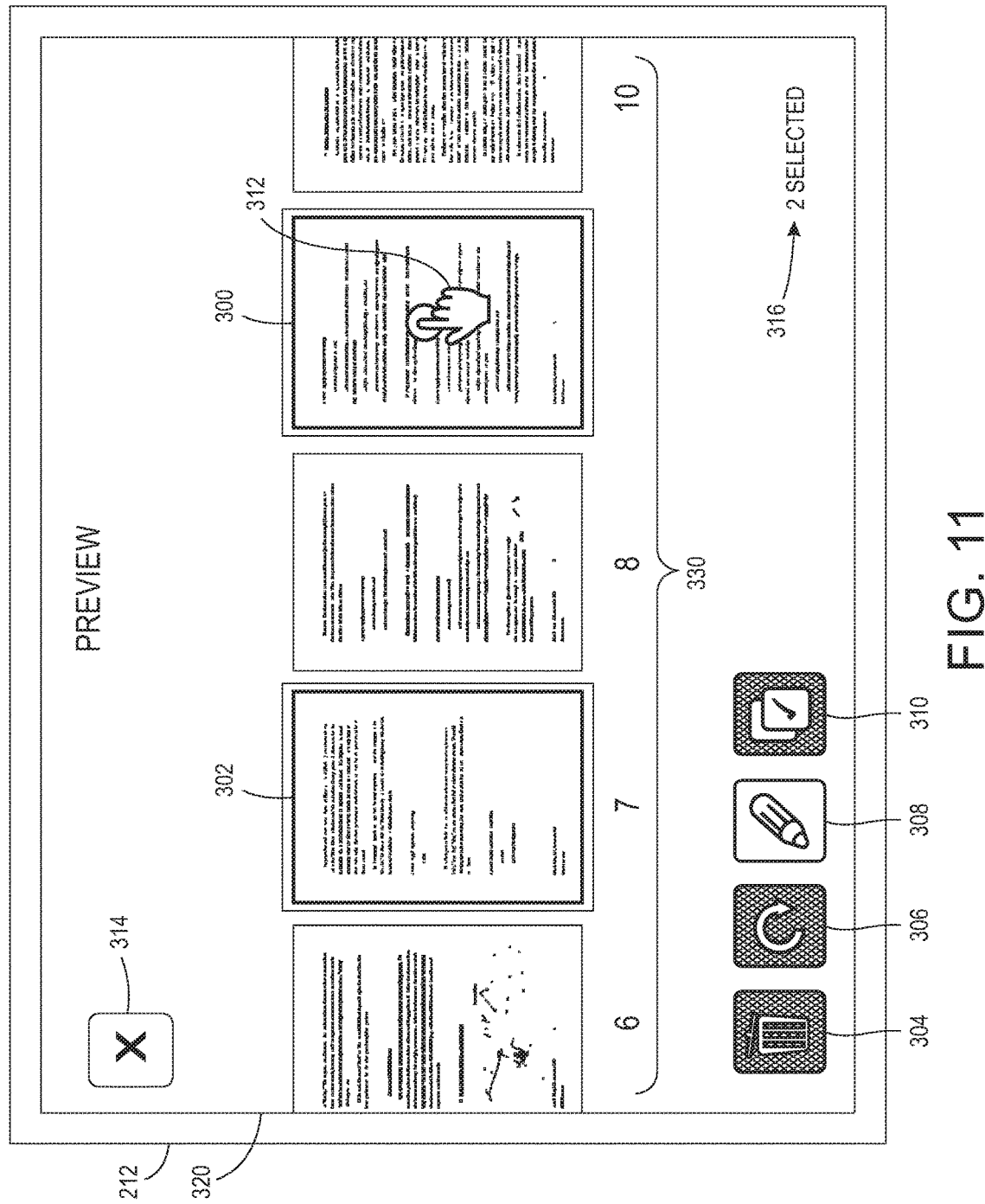

In item 106, such methods detect operation of the user input component 250 selecting at least one of the thumbnail images within the movable thumbnail electronic display image 320 (to identify one or more selected thumbnail images 300). Illustration element 312 shows the operation of the user input component 250 as an aid to understanding how the methods and systems herein operate, and is not necessarily an element that appears within the movable thumbnail electronic display image 320 (especially if the user input component 250 is a touch screen display 212). For example, feature 312 shows that the user can tap, click, point, etc., using any user input 250 to select one of the thumbnail images 300. Once one thumbnail image 300 is selected, a second can be selected merely by tapping, clicking, pointing, etc., on another thumbnail image (as shown in FIG. 11, where thumbnail images 300 and 302 are selected). Thumbnail images can be similarly deselected by tapping, clicking, pointing, etc., a previously selected thumbnail image 300 a second time (e.g., re-selecting a previously selected thumbnail image an additional time). Display element 316 states the number of thumbnail images that are currently selected, and is updated each time a thumbnail image is selected or deselected.

These methods can also visually highlight the selected thumbnail image 300 within the movable thumbnail electronic display image 320, relative to unselected thumbnail images 318 of the document pages, in response to the user selecting one or more of the thumbnail images, as shown in item 108. The highlighting process in item 108 changes appearance of the selected thumbnail image 300 (but, without necessarily altering the size of the selected thumbnail image 300). For example, as shown in items 300 and 302, such highlighting changes (relative to the other unselected thumbnails) the brightness of the selected thumbnail image 300, 302 (or "grays out" the unselected images by reducing their brightness), the color of the selected thumbnail image 300, 302, a characteristic (color, brightness, etc.) of the background of the selected thumbnail image 300, 302, a characteristic (color, brightness, etc.) of the outline (e.g., the border, the edge, etc.) of the selected thumbnail image 300, 302, etc. Deselecting a thumbnail image removes any such highlighting in item 108.

FIG. 3 illustrates various other buttons, such as delete 304, rotate 306, edit 308, select all 310, cancel 314, etc., buttons that are displayed within the movable thumbnail electronic display image 320. Such buttons can be constantly displayed, or can appear or change from reduced brightness (change from "grayed out") to full brightness, in response to selection of one or more of the thumbnail images. Item 110 in FIG. 1 shows selection of such option buttons. For example, in item 110, selection of the delete button 304 deletes the selected thumbnail image(s) 300 from the linear strip of unselected thumbnail images 318, selection of the rotate button 306 rotates the selected thumbnail image(s) 300 within the linear strip of unselected thumbnail images 318, selection of the edit button 308 presents the selected thumbnail image(s) 300 in an edit screen, selection of the select all button 310 selects all the selected thumbnail image(s) 300 within the linear strip of unselected thumbnail images 318, selection of the cancel button 314 returns the view to the print-menu electronic display image 350 shown in FIG. 2, etc.

Figure 4:
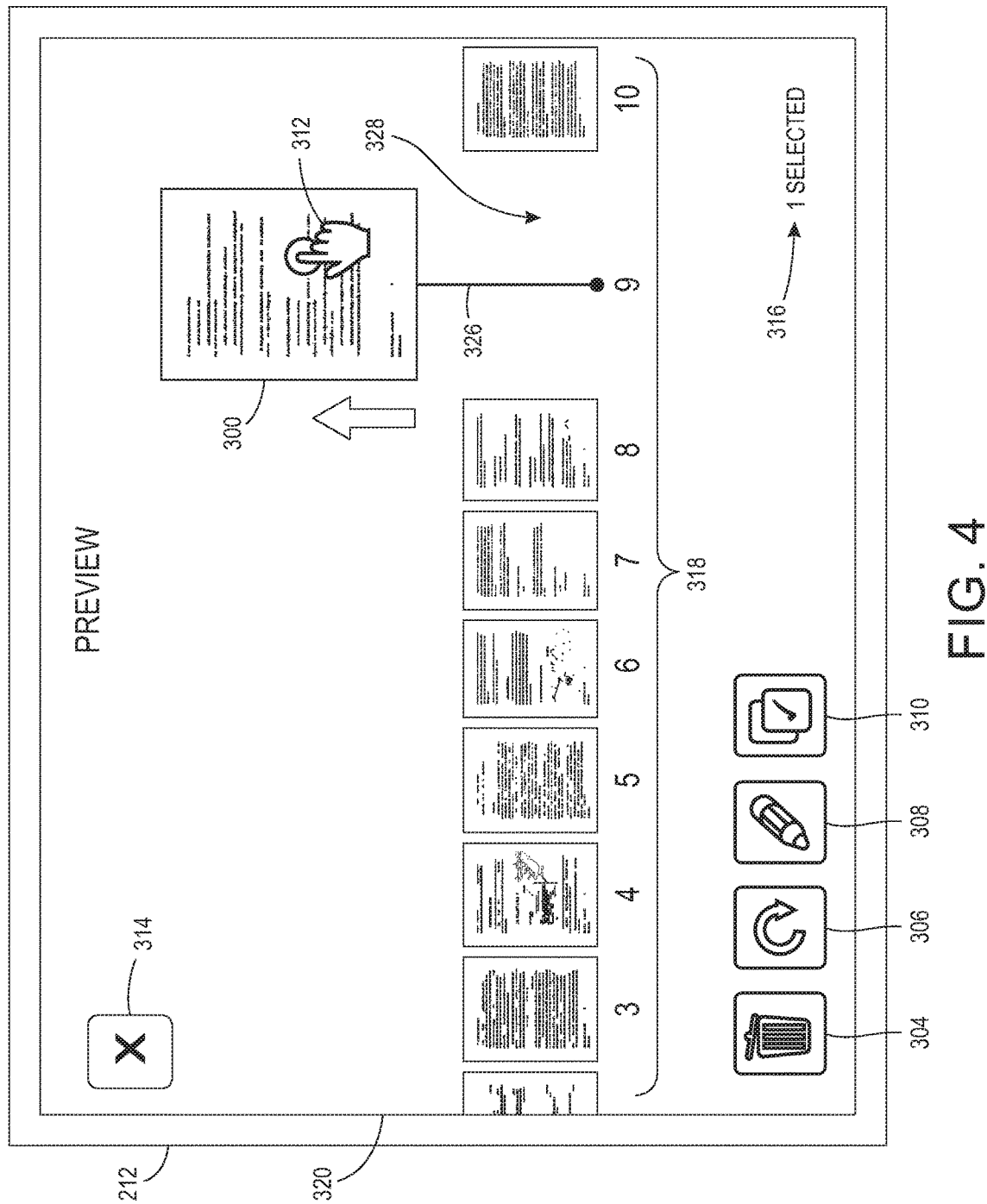

As shown in item 112 in FIG. 1, methods herein further detect operation of the user input component 250 moving the selected thumbnail image 300 in a first direction. This is also shown in FIG. 4 through illustration element 312 and a block arrow, and shows that the first direction is generally perpendicular to (e.g., within 30% perpendicular to) and/or away from, the linear strip of unselected thumbnail images 318 within the movable thumbnail electronic display image 320 (e.g., upward, to the right, to the left, etc.). For example, in item 112, the user can hold down a button (or keep constant contact with a touch screen) while moving a pointing device (or moving the item being contacted on a touch screen) to execute a "click-and-drag" operation, so as to grab and drag one of the thumbnail images 300 away from the unselected thumbnail images 318.

As also shown in FIG. 4, such methods can reduce the size of the unselected thumbnail images 318 relative to the original size within the movable thumbnail electronic display image 320, as shown in item 114 in FIG. 1, in response to the user moving the selected thumbnail image 300 away from the unselected thumbnail images 318 in item 112, but without necessarily altering the size of the selected thumbnail image(s) 300.

Figure 12:
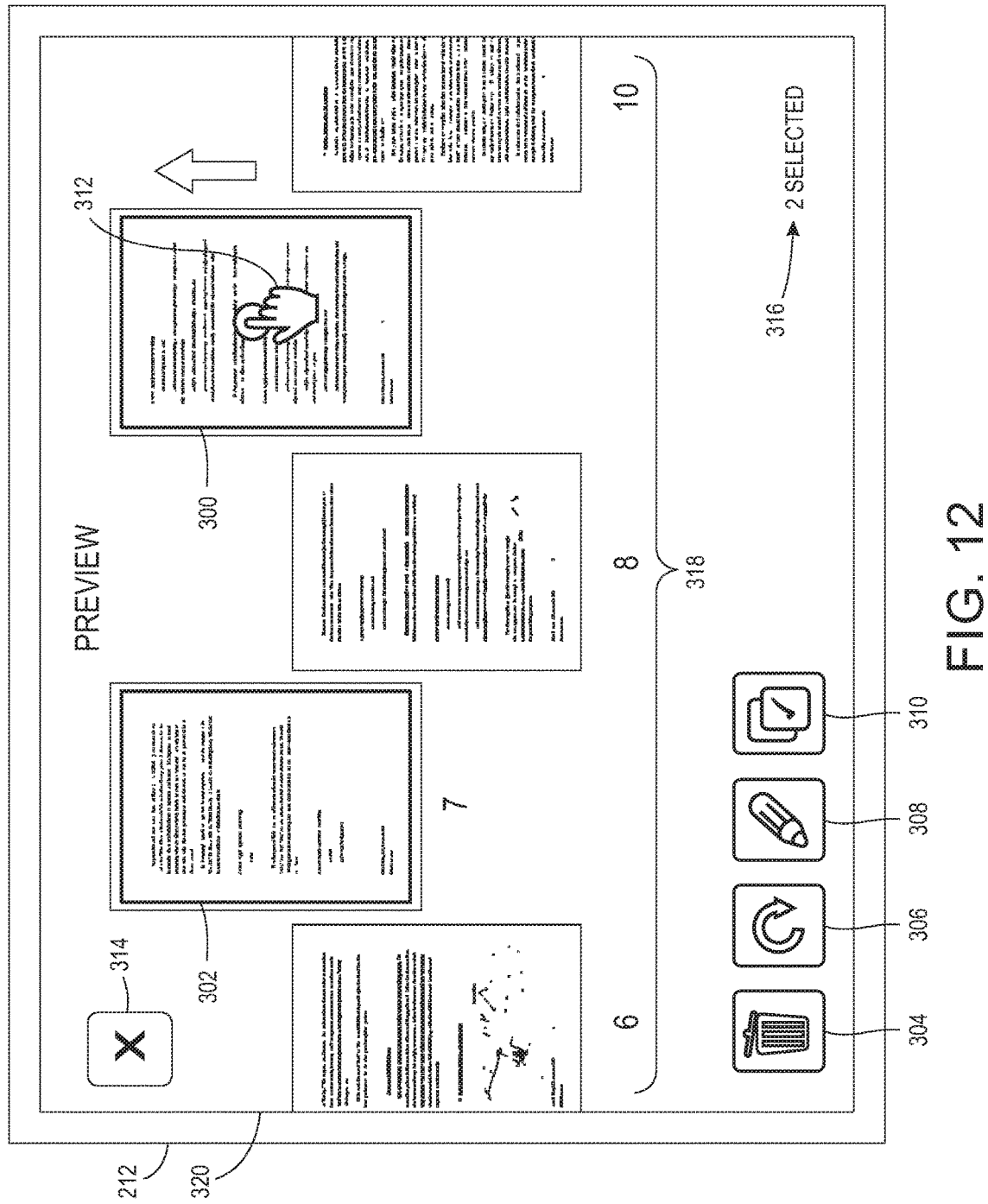
Figure 13:
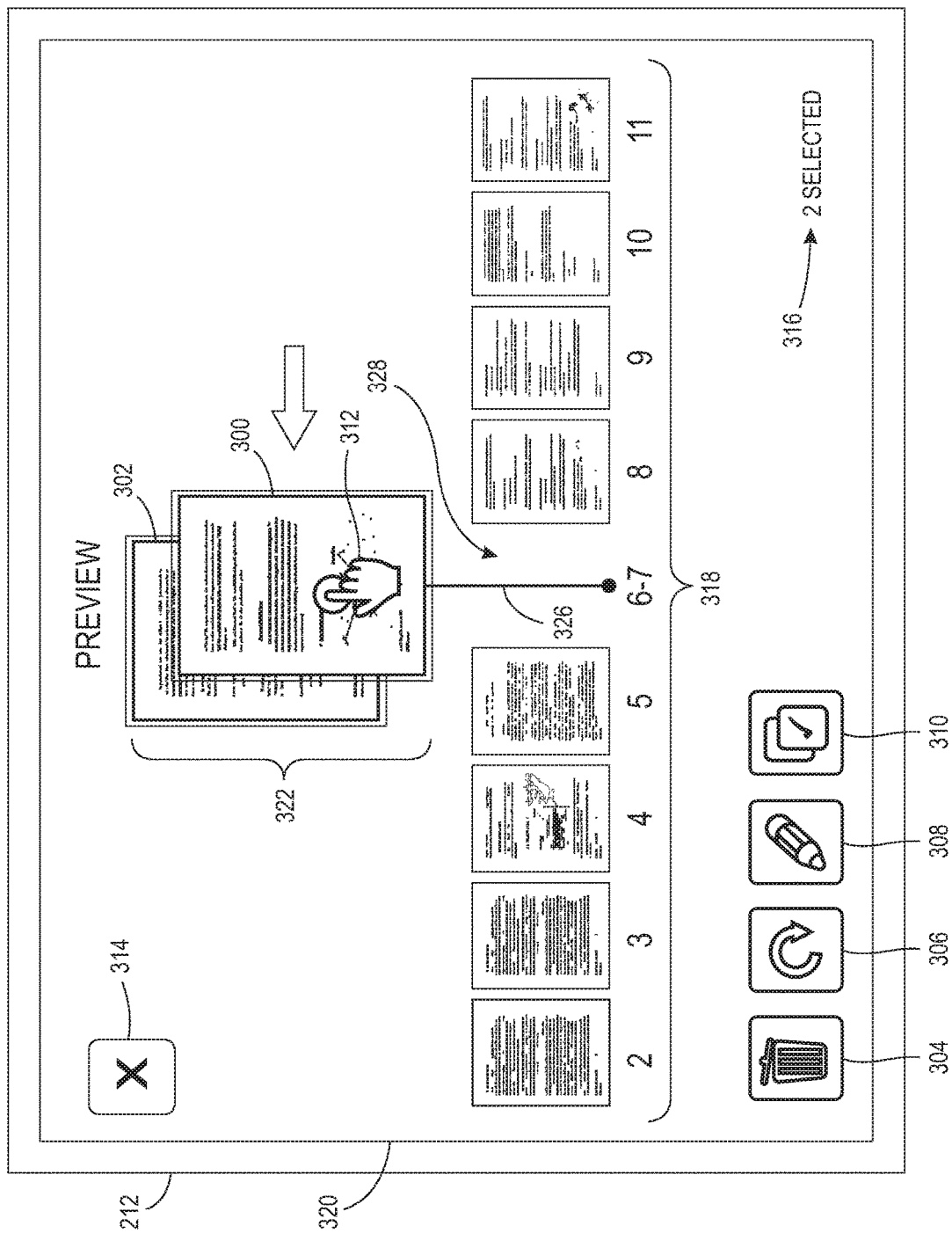

Also, in item 116 in FIG. 1, if multiple thumbnail images have been selected, the multiple selected thumbnail images 300, 302 are stacked as a single unit of "stacked images" within the movable thumbnail electronic display image 320, when the selected thumbnail image 300 is moved away from the unselected thumbnail images 318 in item 112. FIG. 12 shows multiple selected thumbnail images 300, 302 being moved away from the linear strip of unselected thumbnail images 318, and FIG. 13 shows multiple selected thumbnail images 300, 302 being stacked as a single unit of "stacked images" 322 within the movable thumbnail electronic display image 320. Thus, if the user has selected multiple thumbnail images 300, 302, when the user begins to move one of the selected thumbnail images 300 away from the linear strip of unselected thumbnail images 318, in item 116, all selected thumbnail images 300 move in unison away from the linear strip of unselected thumbnail images 318 and smoothly come together as the stacked images 322 on the display 320. The single unit of stacked images 322 thus is separated from the linear strip of unselected thumbnail images 318 after the user moves one of the multiple selected thumbnail images 300.

Additionally, in item 118 in FIG. 1, these methods can move the linear strip of unselected thumbnail images 318 in another direction, opposite the first direction, within the movable thumbnail electronic display image 320, in response to the user moving the selected thumbnail image 300 away from the unselected thumbnail images 318 in item 112 to help visually distinguish the selected and moved thumbnail images 300 from the unselected thumbnail images 318. This is shown, for example, in FIGS. 4 and 12 where the linear strip of unselected thumbnail images 318 is smaller and moved away from the selected thumbnail images 300, 302.

In item 120 in FIG. 1, these methods detect operation of the user input component 250 moving the selected thumbnail image 300 (or single unit of stacked images 322) in a second direction generally parallel to (e.g., within 30% parallel to) the linear strip of unselected thumbnail images 318 within the movable thumbnail electronic display image 320. This is also illustrated in FIGS. 5, 6, and 13 where the illustration element 312 and block arrow show the selected thumbnail image 300 (or single unit of stacked images 322) being moved in a second direction generally parallel to the linear strip of unselected thumbnail images 318.

In item 122 in FIG. 1, the methods increase spacing between two adjacent ones of the unselected thumbnail images 318, from an original linear strip spacing, when the selected thumbnail image 300 (or single unit of stacked images 322) is positioned proximate the two adjacent thumbnail images, as the user input component 250 moves the selected thumbnail image 300 parallel to the linear strip of unselected thumbnail images 318 in item 120. In turn, in item 124 in FIG. 1, the methods herein return the spacing between the unselected thumbnail images 318 to the original spacing, when the selected thumbnail image 300 (or stack of thumbnail images 322) is not positioned proximate the unselected thumbnail images 318 (within the movable thumbnail electronic display image 320).

The feature shown in items 122 and 124 in FIG. 1 is also illustrated in FIGS. 4-6, and 13 where, as the user 312 moves the selected thumbnail image 300 (or single unit of stacked images 322) along the linear strip of unselected thumbnail images 318, the two unselected thumbnails in the linear strip of unselected thumbnail images 318 that are closest to the selected thumbnail image 300 (or single unit of stacked images 322) separate from one another (along the second direction) in item 122, to create a space 328 for the selected thumbnail image 300 (or single unit of stacked images) to be dropped or moved into.

Figure 5:
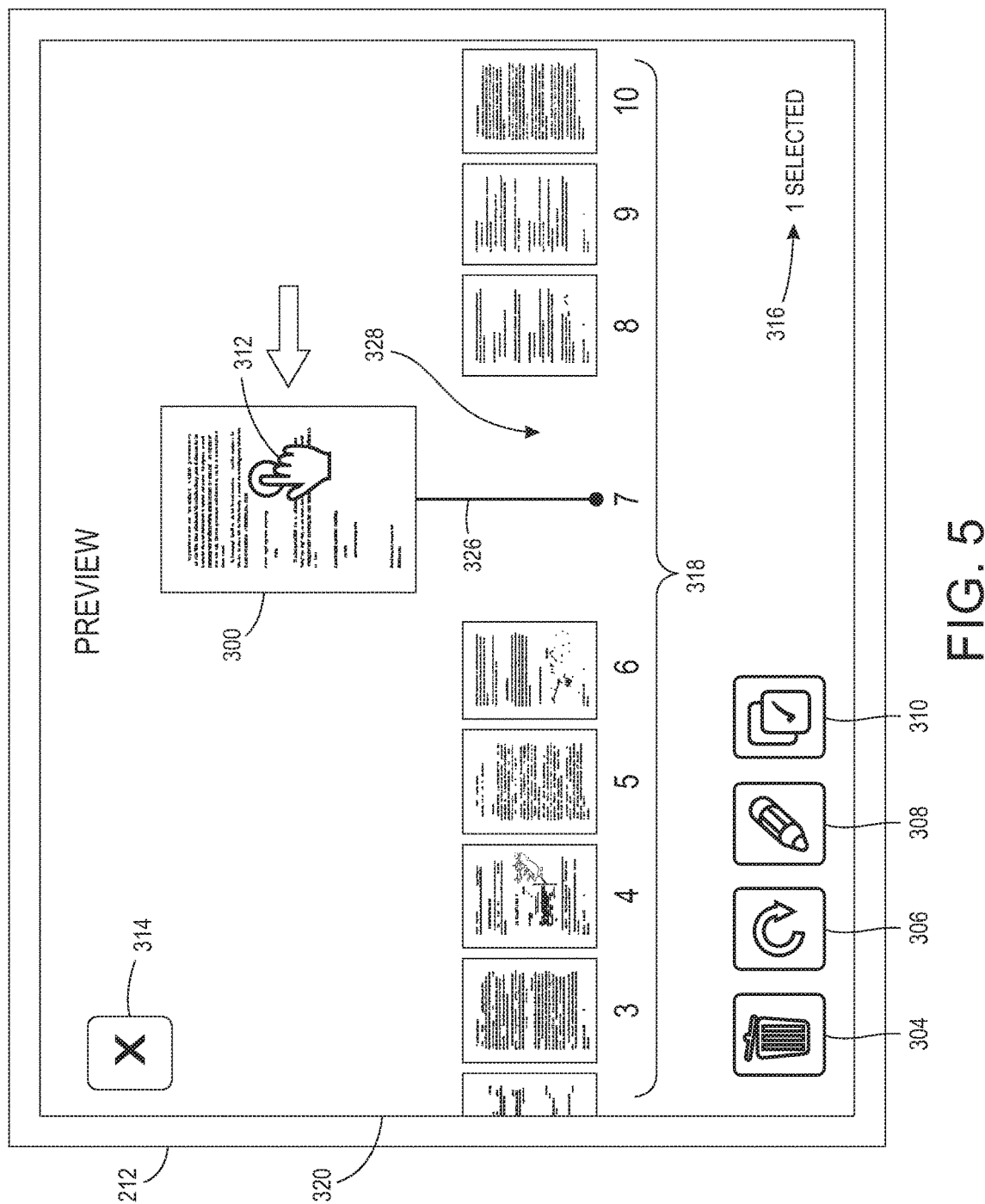
Figure 6:
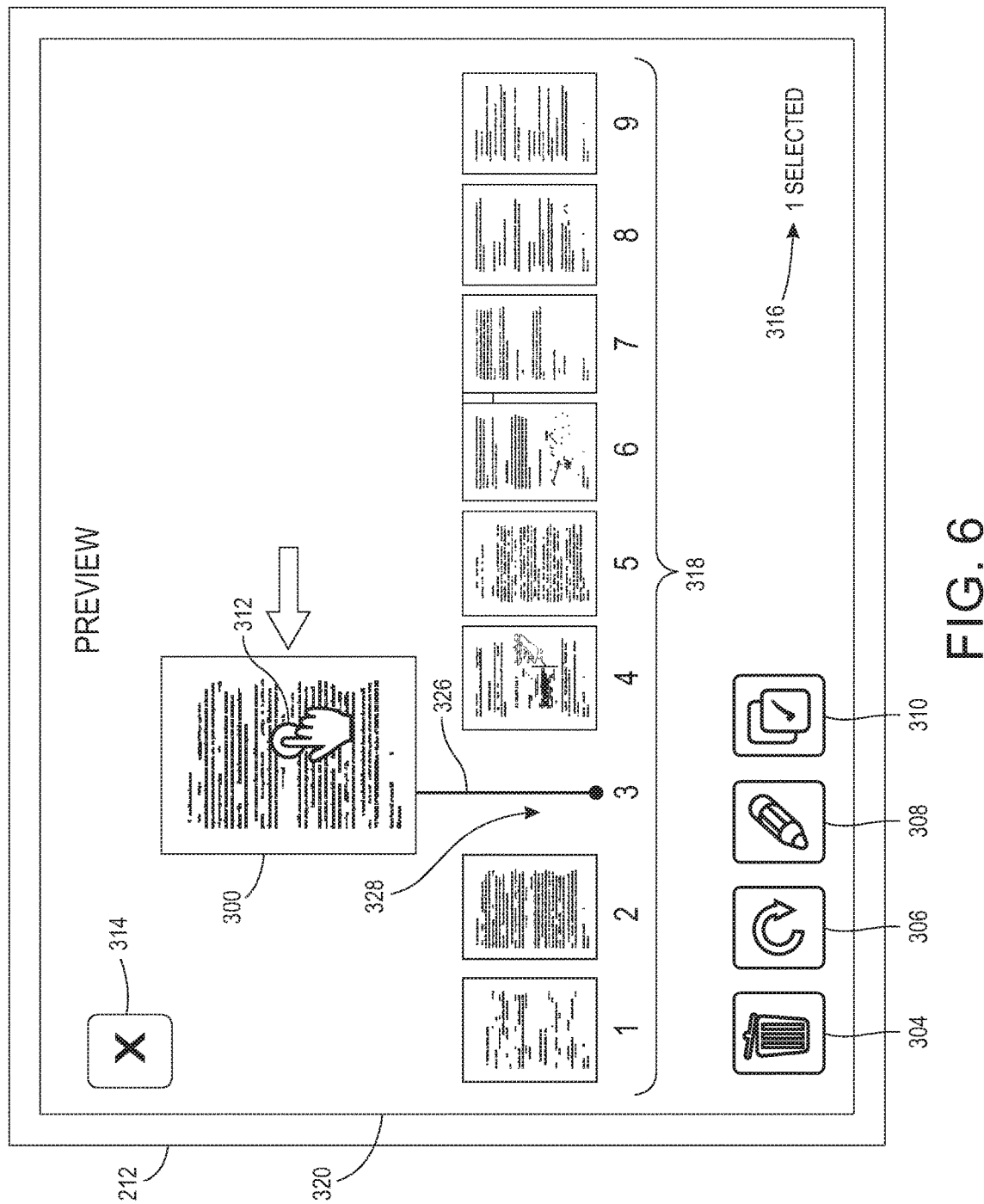
Figure 7:
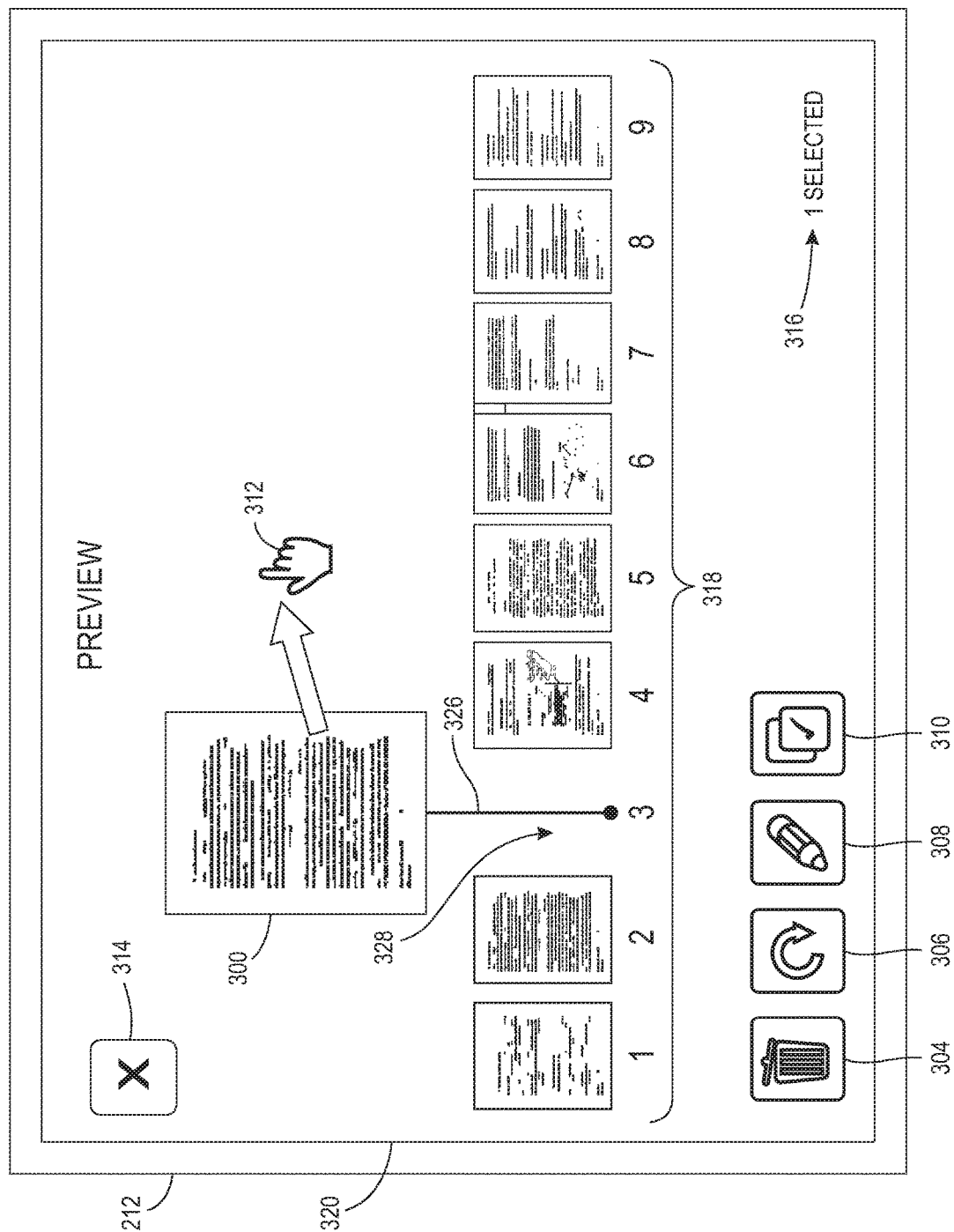

As can be seen by comparing FIGS. 4-6 for example, as the user operation 312 continues to move the selected thumbnail image 300 (or single unit of stacked images) along the linear strip of unselected thumbnail images 318, that closest pair of unselected separated thumbnail images move back to the original linear strip spacing in item 124, so that the created space 328 is no longer between that pair of unselected thumbnail images 318, but has moved to a different pair of unselected thumbnail images 318. Thus, in FIG. 4, the space 328 is created by thumbnail image pages 8 and 10 moving apart as the selected thumbnail image 300 is positioned closest to FIGS. 8 and 10; however, in FIG. 5, the space 328 moves to between thumbnail image pages 6 and 8 by the movable thumbnail electronic display image 320 moving thumbnail image pages 6 and 8 apart as the selected thumbnail image 300 is positioned closest to FIGS. 6 and 8, while at the same time moving thumbnail image pages 8 and 10 back to the original spacing.

Additionally, as the space 328 moves to different positions between thumbnail images in the linear strip of unselected thumbnail images 318, the thumbnail image page numbering changes so that the space 328 is identified using a page number. Therefore, the thumbnail image page 8 shown in FIG. 4 becomes thumbnail image page 9 in FIG. 5, once the space 328 is no longer above that thumbnail image. In a similar manner, the thumbnail image page 7 shown in FIG. 4 changes to thumbnail image page 8 in FIG. 5, when the selected thumbnail image 300 is positioned closest to thumbnail images 6 and 8.

Also, in item 126 in FIG. 1, these methods can display a linear indicator 326 (shown in FIGS. 4-7 and 13) extending from the selected thumbnail image 300 (or single unit of stacked images 322) to the space 328 between the pair of adjacent unselected thumbnail images 318 in response to moving the selected thumbnail image 300 away from the unselected thumbnail images 318 in item 112. The linear indicator 326 can be, for example, a line, an arrow, etc., that extends in a direction generally perpendicular to the linear strip of unselected thumbnail images 318 within the movable thumbnail electronic display image 320. This linear indicator 326 identifies where the selected thumbnail image 300 (or single unit of stacked images 322) will be positioned between the linear strip of unselected thumbnail images 318, if and when released.

As show in item 128 in FIG. 1, these methods detect operation 312 of the user input component 250 of the user "releasing" the selected thumbnail image 300 (or single unit of stacked images 322) by releasing the button (or removing their finger from the touch screen, mouse, trackpad, trackball, etc.) that was being held in the previously described click-and-drag operation. The operation of releasing the selected thumbnail image 300 is shown by block arrow in FIG. 7, and can include movement of the selected thumbnail image 300 toward the space 328 before the button or screen is released.

Figure 8:
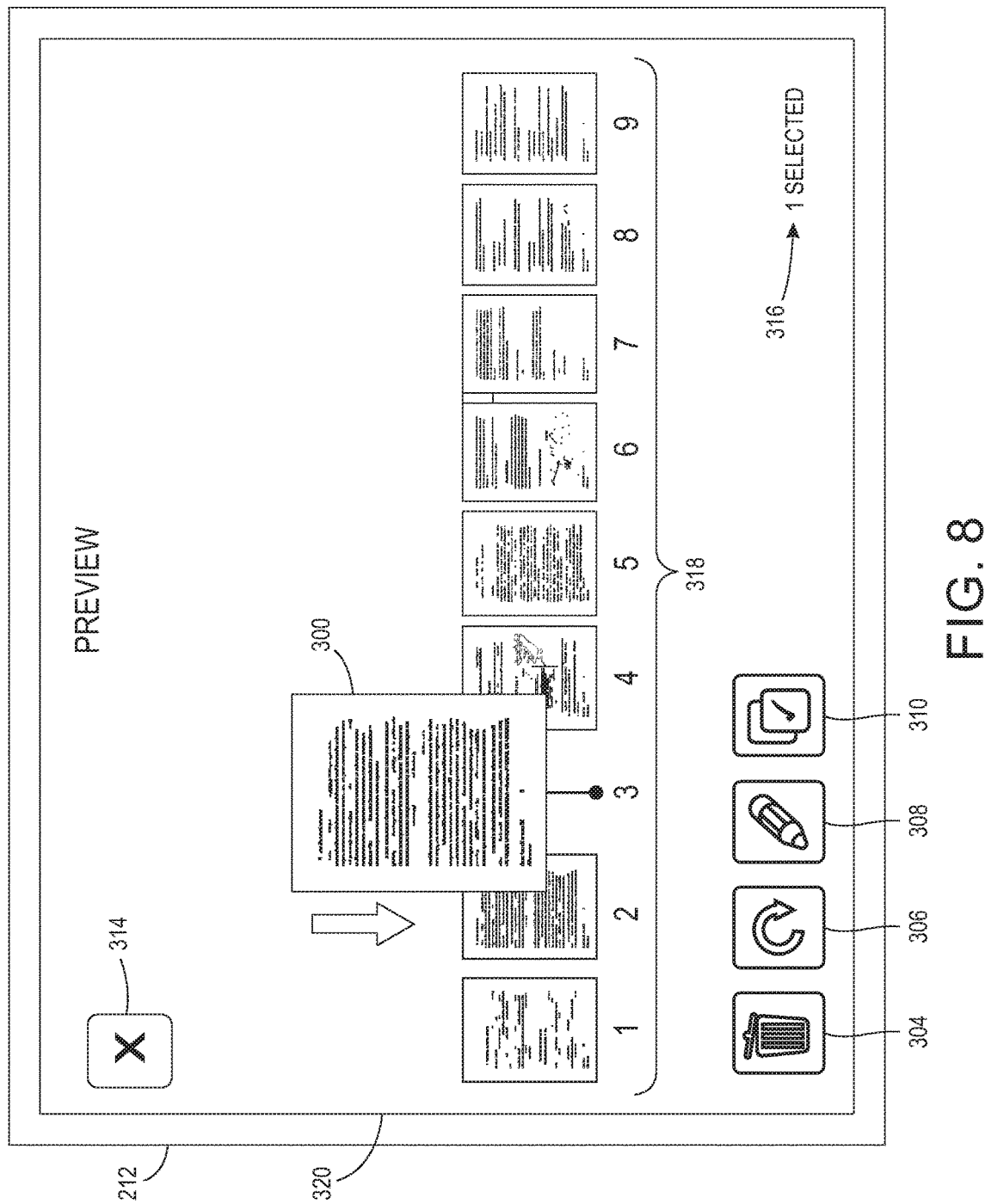
Figure 9:
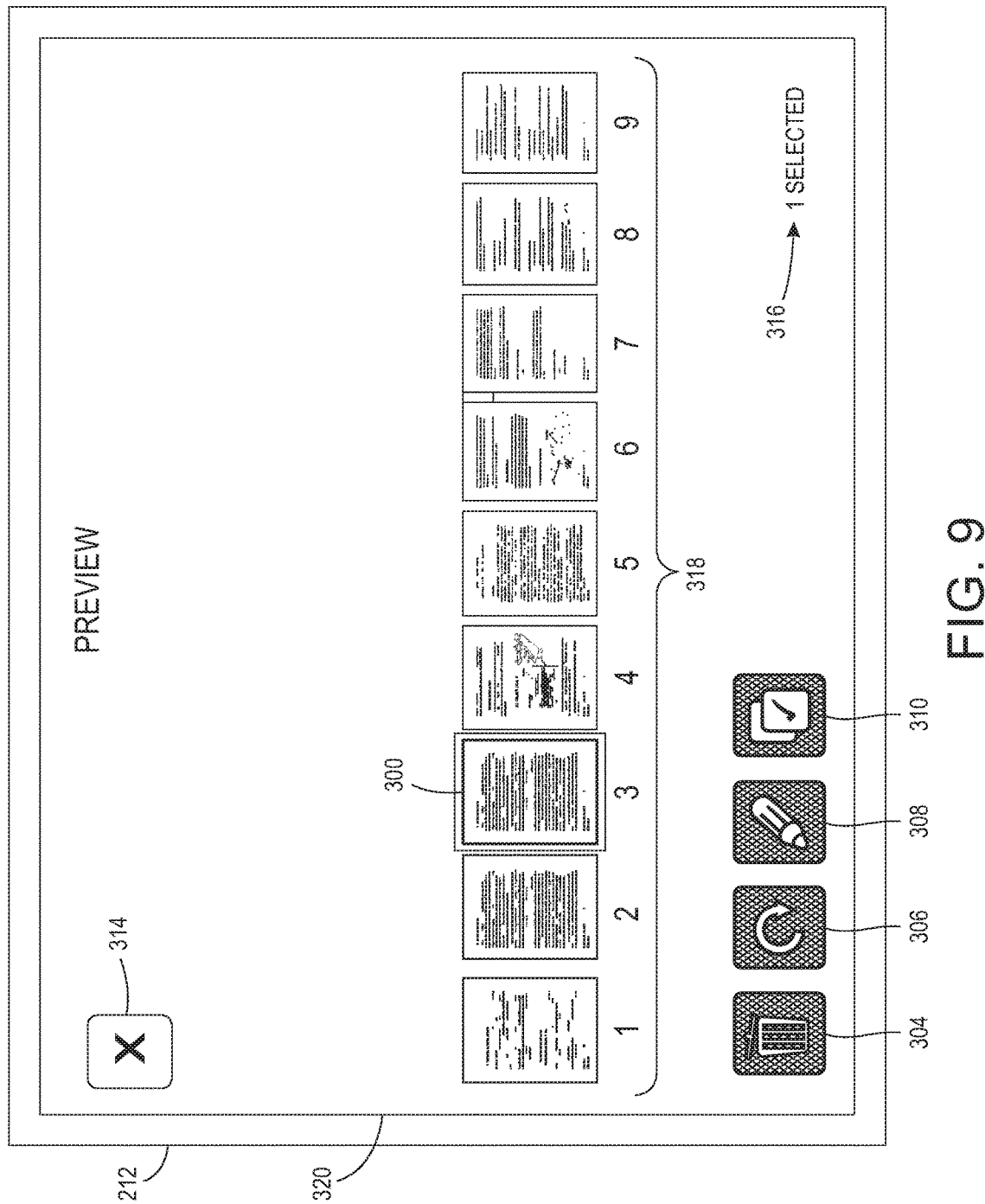
Figure 14:
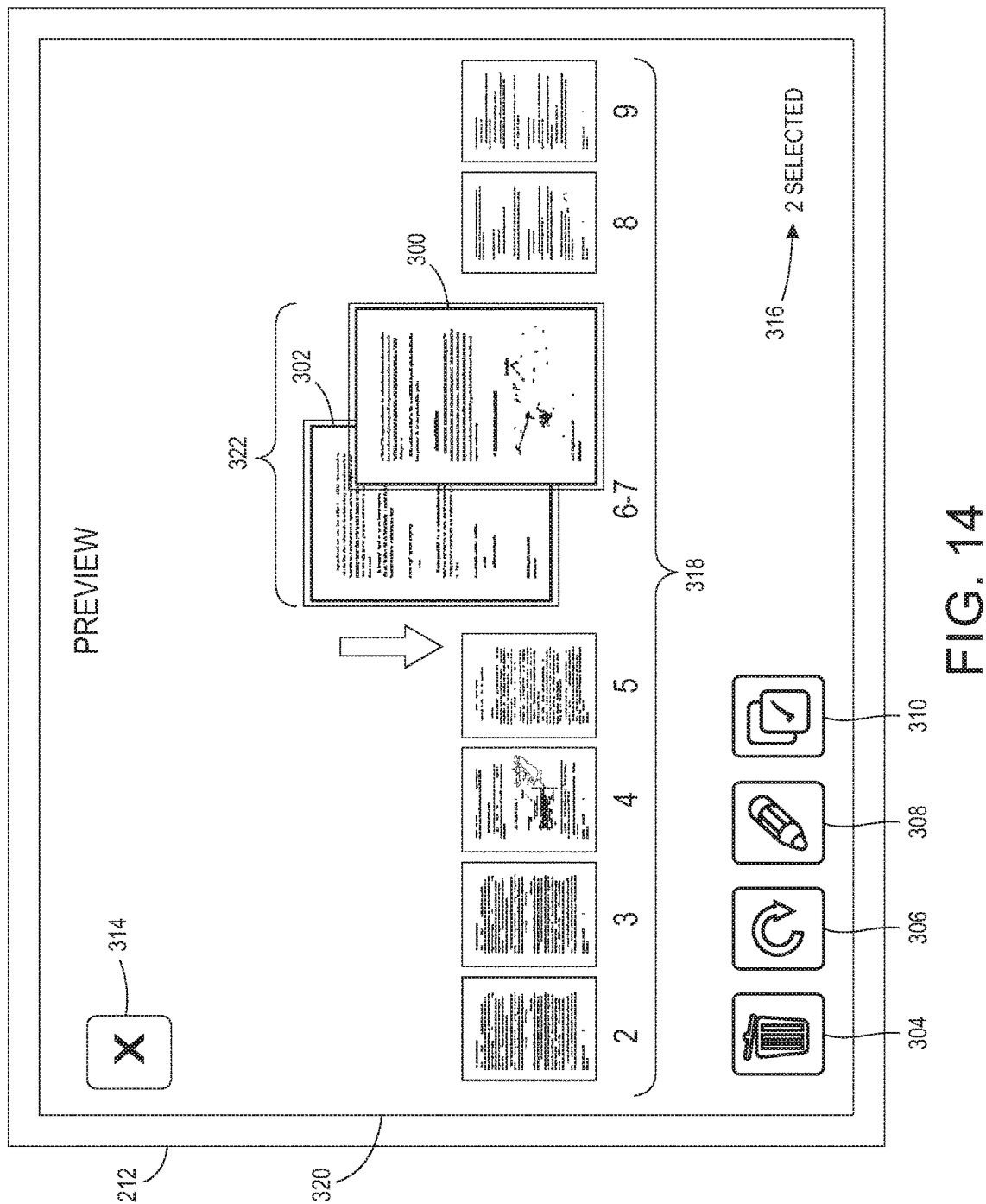
Figure 15:
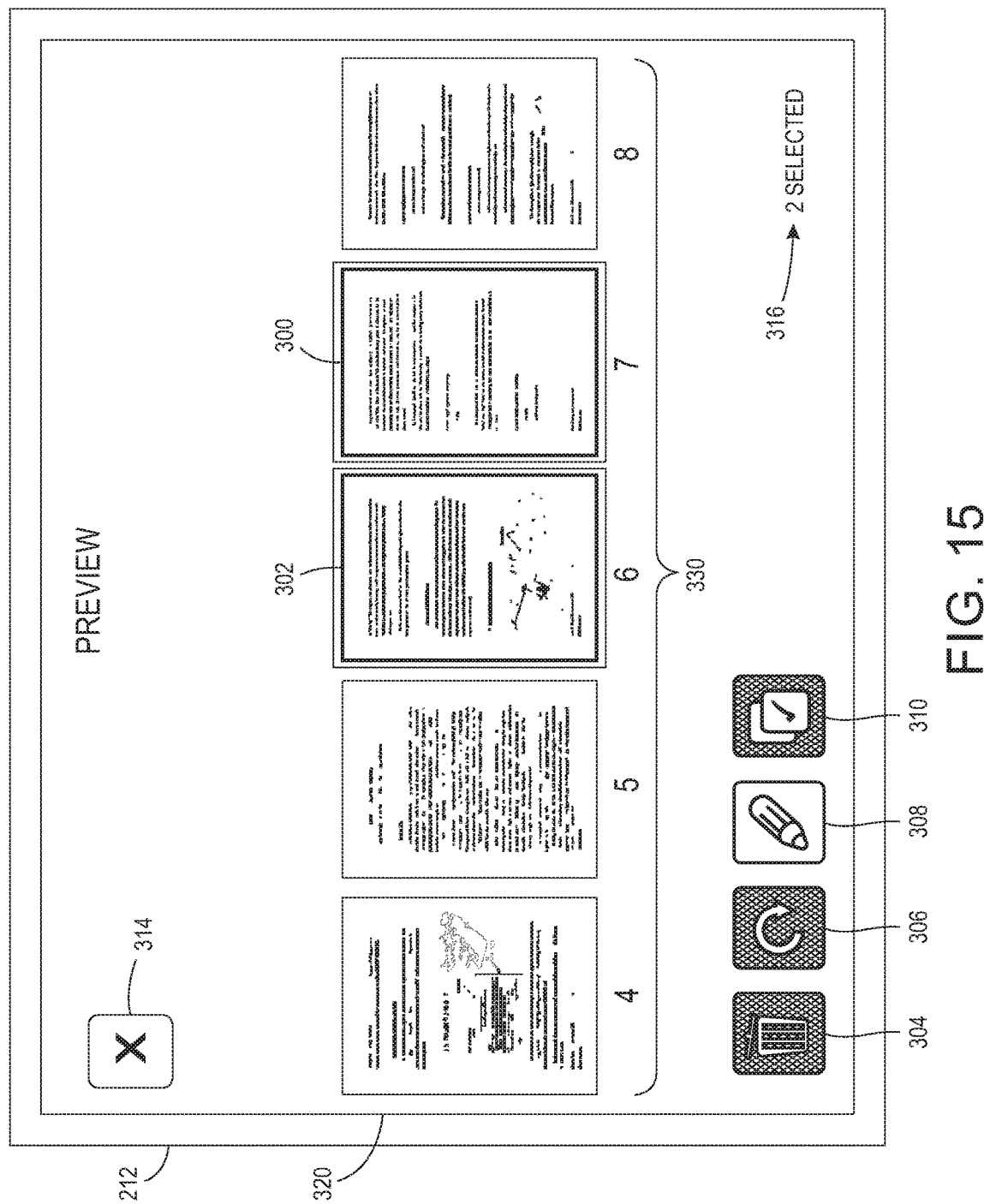

As shown in FIGS. 8, and 14, after the user releases the thumbnail image in item 128 in FIG. 1, the selected thumbnail image 300 (or single unit of stacked images 322) moves in a third direction (opposite the first direction, shown by block arrow) toward the linear strip of unselected thumbnail images 318 until the selected thumbnail image 300 is (or single unit of stacked images 322 are) positioned within the space 328 between the pair of adjacent unselected thumbnail images in the linear strip of unselected thumbnail images 318 (as shown in item 130 in FIG. 1). FIGS. 9 and 15 show the selected thumbnail images 300, 302 back within the linear strip of unselected thumbnail images 318, and such images receive the thumbnail image page number(s) associated with the space 328 into which they were released.

Figure 10:
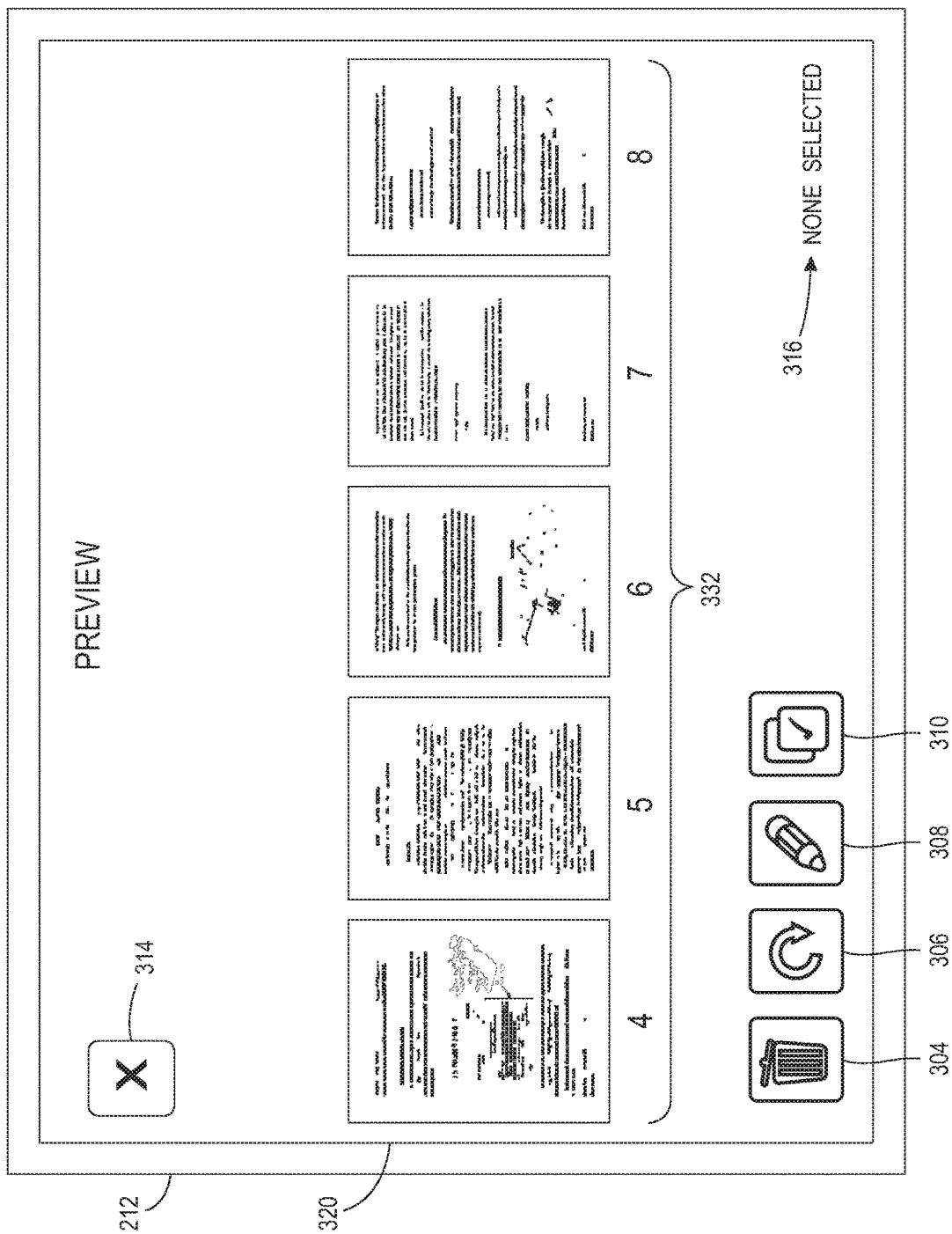

As the selected thumbnail image 300 moves into the space 328 between the pair of adjacent unselected thumbnail images 318 in item 130 (after being so released in item 128) the linear strip of unselected thumbnail images 318 returns to the original size in item 132 so that the released thumbnail images moves to be positioned between other similarly-sized thumbnail images within the linear strip of unselected thumbnail images 318, and this is illustrated in FIGS. 10 and 15.

As also shown in FIG. 14, if multiple thumbnail images had been selected, the unit of stacked images 322 spreads out into individual thumbnail images 300, 302 (shown in item 134, in FIG. 1) as the unit of stacked images 322 moves into the space 328 between the pair of adjacent unselected thumbnail images. When the unit of stacked images 322 spreads out in item 134, the order of such thumbnail images within the reordered linear strip of unselected thumbnail images 318 is maintained from the relative original order. Therefore, in item 134, a selected thumbnail image with a higher original page number will appear after one with a lower original page number within the reordered linear strip of thumbnail images, when the unit of stacked images 322 is released and spreads out within the space 328 in the linear strip of unselected thumbnail images 318.

Additionally, once the user releases the selected thumbnail image 300 in item 128, any highlighting is removed from the thumbnail images in item 136, so that a newly ordered linear strip of unselected thumbnail images 332, without any highlighting, is presented on the display, as also shown in FIG. 10. Therefore, this process changes the linear strip of original size thumbnail images 330 of the document pages from the original page order to a different order having the selected thumbnail image(s) in a different location within the newly ordered linear strip of unselected thumbnail images 332.

The hardware described herein plays a significant part in permitting the foregoing method to be performed, rather than function solely as a mechanism for permitting a solution to be achieved more quickly, (i.e., through the utilization of a computer for performing calculations).

As would be understood by one ordinarily skilled in the art, the processes described herein cannot be performed by a human alone (or one operating with a pen and a pad of paper) and instead such processes can only be performed by a machine (especially when the electronic display, automated processing, and altering of page order within an electronic document is considered). Specifically, processes such as displaying electronic data streams, altering electronic items that are being displayed, using scanners, printers, and display devices, etc., requires the utilization of different specialized machines, and humans cannot perform such processing without machines. Further, such machine-only processes are not mere "post-solution activity" because the methods herein involve and are constantly tied to electronic graphic user interface interaction. In other words, these various machines are integral with the methods herein because the methods cannot be performed without the machines (and cannot be performed by humans alone).

Additionally, the methods herein solve many highly complex technological problems. For example, as mentioned above, users are often confused about how to reorder pages within an electronic document, or are frustrated and make errors when attempting to do so. Methods herein solve this technological problem by permitting users to intuitively select and move one or more pages to new locations, using helpful and graphically driven display interactive tools. This reduces the amount of mistakes a user may generate when reordering pages, and increases user satisfaction by simplifying the process for the user. By granting such benefits, the methods herein reduce the amount of errors generated, thereby solving a substantial technological problem that providers experience today.

Figure 16:
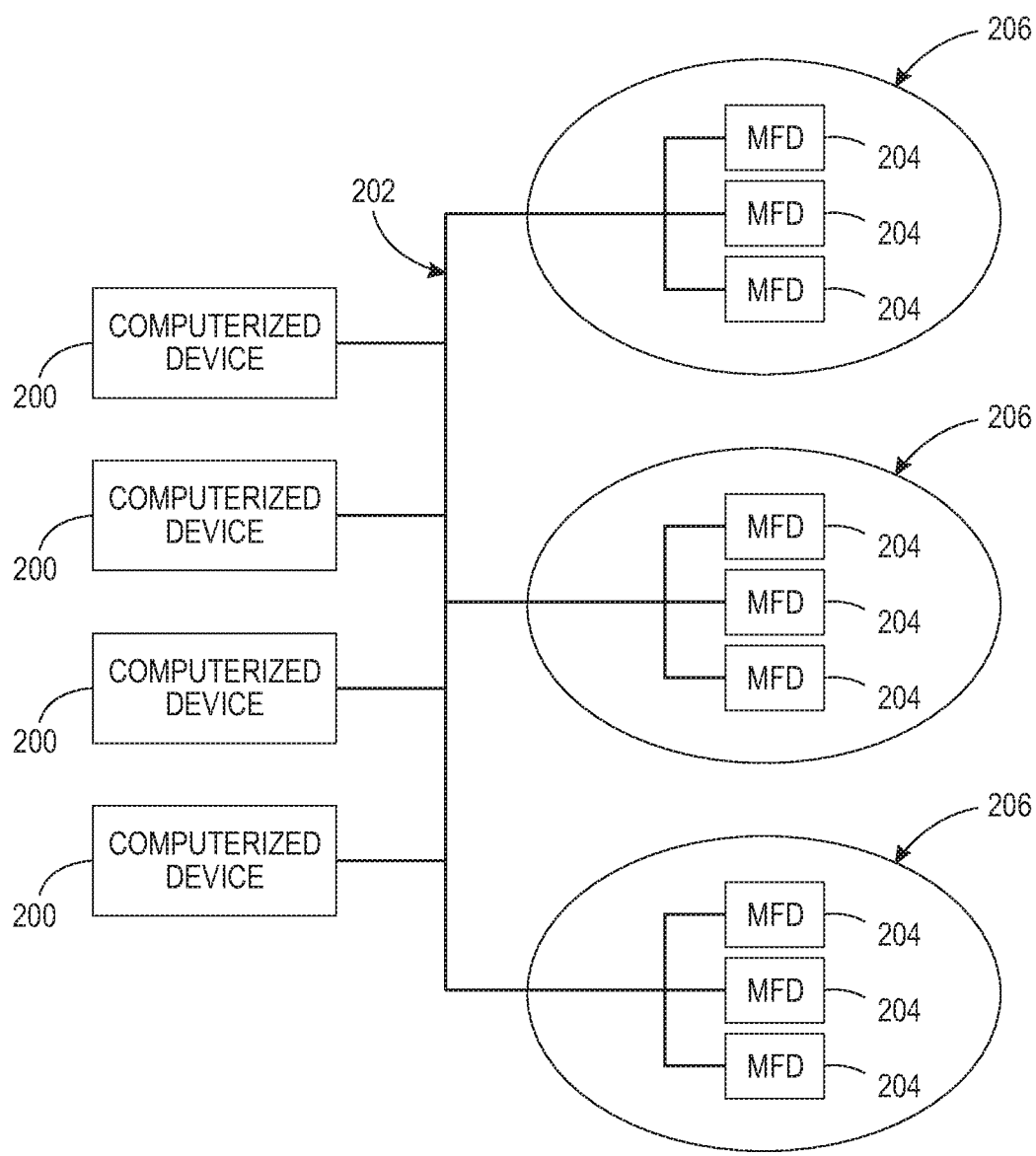
FIG. 16 is a schematic diagram illustrating systems herein.

As shown in FIG. 16, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 17:
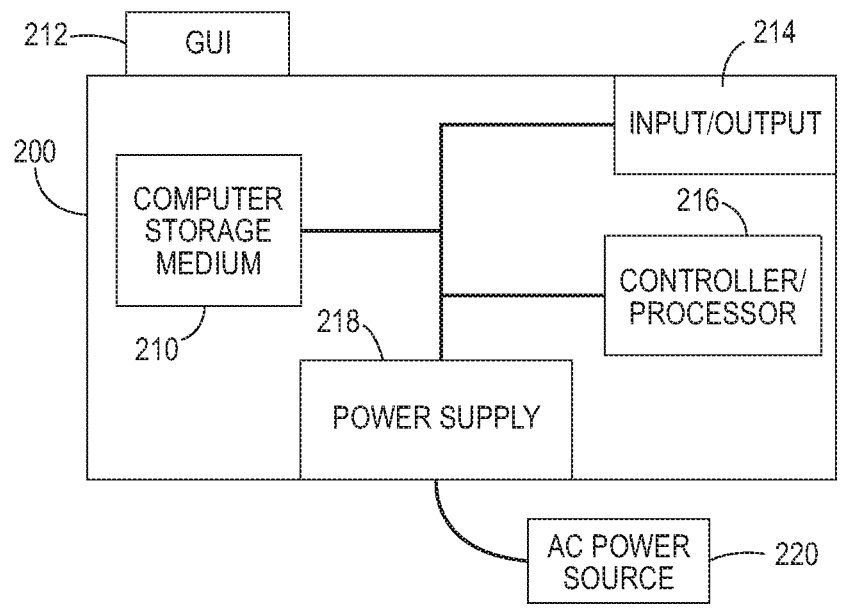
FIGS. 17-18 are schematic diagrams illustrating devices herein.

FIG. 17 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 17, a body housing has one or more functional components that operate on power supplied from an alternating current (AC) source 220 by the power supply 218. The power supply 218 can comprise a common power conversion unit, power storage element (e.g., a battery, etc), etc.

Figure 18:
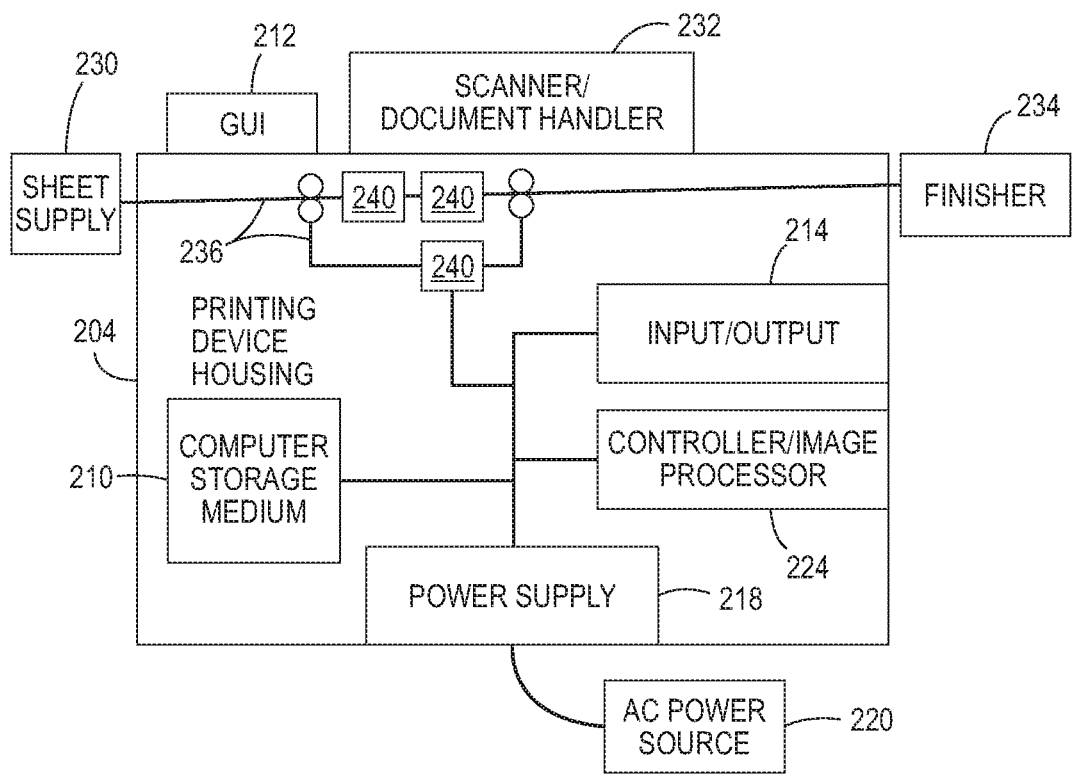

FIG. 18 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt 248 or an intermediate transfer belt 260, or devices that print directly to print media (e.g., inkjet printers, ribbon-based contact printers, etc.).

As would be understood by those ordinarily skilled in the art, the printing device 204 shown in FIG. 18 is only one example and the systems and methods herein are equally applicable to other types of printing devices that may include fewer components or more components. For example, while a limited number of printing engines and paper paths are illustrated in FIG. 18, those ordinarily skilled in the art would understand that many more paper paths and additional printing engines could be included within any printing device used with systems and methods herein.

Thus, as shown above, an exemplary apparatus herein includes (among other components) a processor 216, 224, a display device 212 operatively connected to the processor 216, 224, etc. The display device 212 includes one or more user input 250 components interacting with screens displayed on the display device 212. The processor 216, 224 provides a "print-menu" electronic display image 350 related to printing a document to the display device 212, and the display device 212 displays the same. The print-menu electronic display image 320 has a "preview" menu option. Such a document includes document pages in an original page order. In response to selection of the preview menu option through the user input 250 component, the processor 216, 224 provides a "movable thumbnail" electronic display image 320 to the display device 212, and the display device 212 displays the same.

The movable thumbnail electronic display image 320 displays a linear strip of original size thumbnail images 318 of the document pages sequentially adjacent one another, in the original page order, along a dimension of the display device 212 (e.g., parallel to an edge of the display device 212). The user input 250 component can detect selection of at least one of the thumbnail images 318 of document pages within the movable thumbnail electronic display image 320 to identify a selected thumbnail image 300. In response to this selection, the display device 212 highlights the selected thumbnail image 300 within the movable thumbnail electronic display image 320 relative to unselected thumbnail images 318 of the document pages, by changing the appearance of the selected thumbnail image 300, without altering the size of the selected thumbnail image 300.

Again, if multiple thumbnail images 318 have been selected, the multiple selected thumbnail images 300 are stacked as a single unit 322. Thus, if the user has selected multiple thumbnail images 300, 302, when the user begins to move one of the selected thumbnail images 300 away from the linear strip of unselected thumbnail images 318, all selected thumbnail images 300, 302 move in unison away from the linear strip of unselected thumbnail images 318 and smoothly come together as the stacked images 322 on the display 320.

The user input 250 component also can detect movement of the selected thumbnail image 300 in a first direction generally perpendicular to, and away from, the linear strip of unselected thumbnail images 318 within the movable thumbnail electronic display image 320. In response to the movement of the selected thumbnail image 300 away from the unselected thumbnail images 318, the display device 212 reduces the size of the unselected thumbnail images 318 relative to the original size within the movable thumbnail electronic display image 320, again without altering the size of the selected thumbnail image 300. As noted above, the display 320 can provide a linear indicator 326 that identifies where the selected thumbnail image 300 (or single unit of stacked images) will be positioned within the linear strip of unselected thumbnail images 318, if and when released. Thus, the user can release the selected scanned pages, and the pages will snap to the location of the linear indicator 326.

Additionally, the user input 250 component can detect movement of the selected thumbnail image 300 in a second direction generally parallel to the linear strip of unselected thumbnail images 318 within the movable thumbnail electronic display image 320. The display device 212 increases spacing (328) between two adjacent thumbnail images in the linear strip of unselected thumbnail images 318, from the original spacing, when the selected thumbnail image 300 is positioned proximate the two adjacent thumbnail images 318 (as the user input 250 component detects movement of the selected thumbnail image 300 in the second direction parallel to the linear strip of unselected thumbnail images 318). Additionally, the display device 212 returns the spacing between other adjacent thumbnail images to the original spacing when the selected thumbnail image 300 is not positioned proximate the other adjacent ones of the unselected thumbnail images 318, within the movable thumbnail electronic display image 320.

When the selected thumbnail image 300 is released into the space 328 between the two adjacent thumbnail images 318, the display device 212 returns the unselected thumbnail images 318 to the original size, and this changes the linear strip of original size thumbnail images 318 of the document pages from the original page order to a different order having the selected thumbnail image 300 in a different location within the linear strip.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   providing, from a processor to a display device, a print-menu electronic display image related to printing a document,
      said print-menu electronic display image has a preview menu option,
      said document comprises document pages in an original page order;
   providing, from said processor to said display device, a movable thumbnail electronic display image, in response to selection of said preview menu option,
      said movable thumbnail electronic display image displays a linear strip of original size thumbnail images of said document pages sequentially adjacent one another in said original page order;
   highlighting a selected thumbnail image within said movable thumbnail electronic display image relative to unselected thumbnail images of said document pages, in response to selection of said selected thumbnail image, by changing appearance of said selected thumbnail image without altering the size of said selected thumbnail image;
   reducing the size of said unselected thumbnail images relative to said original size within said movable thumbnail electronic display image to leave a linear strip of reduced size unselected thumbnail images, in response to moving of said selected thumbnail image away from said unselected thumbnail images within said movable thumbnail electronic display image, without altering the size of said selected thumbnail image;
   increasing spacing between two adjacent ones of said unselected thumbnail images from an original spacing when said selected thumbnail image is positioned proximate said two adjacent ones of said unselected thumbnail images as said selected thumbnail image is moved parallel to said linear strip of reduced size unselected thumbnail images, within said movable thumbnail electronic display image; and
   returning said unselected thumbnail images to said original size in response to said selected thumbnail image being released between said two adjacent ones of said unselected thumbnail images within said movable thumbnail electronic display image, to change said linear strip of original size thumbnail images of said document pages from said original page order to a different order having said selected thumbnail image in a different location within said linear strip.

2. The method according to claim 1, further comprising:
   stacking multiple selected thumbnail images as a single unit of stacked images within said movable thumbnail electronic display image, in response to said moving of said selected thumbnail image away from said unselected thumbnail images, when multiple ones of said selected thumbnail images are selected during said selecting; and
   unstacking multiple selected thumbnail images within said movable thumbnail electronic display image, in response to said selected thumbnail image being released, when multiple ones of said selected thumbnail images are selected during said selecting.

3. The method according to claim 2, further comprising positioning said single unit of stacked images between said two adjacent ones of said unselected thumbnail images within said movable thumbnail electronic display image, when said selected thumbnail image is positioned between said two adjacent ones of said unselected thumbnail images within said movable thumbnail electronic display image.

4. The method according to claim 1, further comprising displaying a linear indicator extending from said selected thumbnail image to said linear strip of reduced size unselected thumbnail images within said movable thumbnail electronic display image, in response to said moving of said selected thumbnail image away from said unselected thumbnail images, said linear indicator identifying where said selected thumbnail image is positioned between said two adjacent ones of said unselected thumbnail images.

5. The method according to claim 1, further comprising moving said linear strip of reduced size unselected thumbnail images away from said selected thumbnail image within said movable thumbnail electronic display image, in response to said moving of said selected thumbnail image away from said unselected thumbnail images.

6. The method according to claim 1, said highlighting said selected thumbnail image comprises at least one of: changing a brightness of said selected thumbnail image; changing a color of said selected thumbnail image; changing a characteristic of a background of said selected thumbnail image; and changing a characteristic of an outline of said selected thumbnail image.

7. The method according to claim 1, further comprising displaying a delete button, an edit button, a rotate button, and a select all button within said movable thumbnail electronic display image, in response to said selection of said selected thumbnail image,
  selection of said delete button deletes said selected thumbnail image from said linear strip of original size thumbnail images within said movable thumbnail electronic display image,
  selection of said edit button presents said selected thumbnail image in an edit screen,
  selection of said rotate button rotates said selected thumbnail image within said linear strip of original size thumbnail images within said movable thumbnail electronic display image, and
  selection of said select all button selects all said selected thumbnail image within said linear strip of original size thumbnail images within said movable thumbnail electronic display image.

8. A method comprising:
  providing, from a processor to a display device, a print-menu electronic display image related to printing a document,
    said print-menu electronic display image has a preview menu option,
    said display device includes a user input component interacting with screens displayed on said display device, and
    said document comprises document pages in an original page order;
  providing, from said processor to said display device, a movable thumbnail electronic display image, in response to selection of said preview menu option through said user input component,
    said movable thumbnail electronic display image displays a linear strip of original size thumbnail images of said document pages sequentially adjacent one another in said original page order along a dimension of said display device;
  detecting operation of said user input component selecting at least one of said thumbnail images of document pages within said movable thumbnail electronic display image to identify a selected thumbnail image;
  highlighting said selected thumbnail image within said movable thumbnail electronic display image relative to unselected thumbnail images of said document pages, in response to said selecting, by changing appearance of said selected thumbnail image without altering the size of said selected thumbnail image;
  detecting operation of said user input component moving said selected thumbnail image in a first direction perpendicular to, and away from, said unselected thumbnail images within said movable thumbnail electronic display image;
  reducing the size of said unselected thumbnail images relative to said original size within said movable thumbnail electronic display image to leave a linear strip of reduced size unselected thumbnail images, in response to said moving of said selected thumbnail image away from said unselected thumbnail images, without altering the size of said selected thumbnail image;
  detecting operation of said user input component moving said selected thumbnail image in a second direction parallel to said linear strip of reduced size unselected thumbnail images within said movable thumbnail electronic display image;
  increasing spacing between two adjacent ones of said unselected thumbnail images from an original spacing when said selected thumbnail image is positioned proximate said two adjacent ones of said unselected thumbnail images as said user input component moves said selected thumbnail image in said second direction parallel to said linear strip of reduced size unselected thumbnail images, and returning said spacing between said unselected thumbnail images to said original spacing when said selected thumbnail image is not positioned proximate said unselected thumbnail images, within said movable thumbnail electronic display image; and
  returning said unselected thumbnail images to said original size in response to releasing said selected thumbnail image between said two adjacent ones of said unselected thumbnail images within said movable thumbnail electronic display image, to change said linear strip of original size thumbnail images of said document pages from said original page order to a different order having said selected thumbnail image in a different location within said linear strip.

9. The method according to claim 8, further comprising:
  stacking multiple selected thumbnail images as a single unit of stacked images within said movable thumbnail electronic display image, in response to said moving of said selected thumbnail image away from said unselected thumbnail images, when multiple ones of said selected thumbnail images are selected during said selecting; and
  unstacking multiple selected thumbnail images within said movable thumbnail electronic display image, in response to said selected thumbnail image being released, when multiple ones of said selected thumbnail images are selected during said selecting.

10. The method according to claim 9, further comprising positioning said single unit of stacked images between said two adjacent ones of said unselected thumbnail images within said movable thumbnail electronic display image, when said selected thumbnail image is positioned between said two adjacent ones of said unselected thumbnail images within said movable thumbnail electronic display image.

11. The method according to claim 8, further comprising displaying a linear indicator extending from said selected thumbnail image perpendicular to said linear strip of reduced size unselected thumbnail images within said movable thumbnail electronic display image, in response to said moving of said selected thumbnail image away from said unselected thumbnail images, said linear indicator identifying where said selected thumbnail image is positioned between said two adjacent ones of said unselected thumbnail images.

12. The method according to claim 8, further comprising moving said linear strip of reduced size unselected thumbnail images in a third direction, opposite said first direction, within said movable thumbnail electronic display image, in response to said moving of said selected thumbnail image away from said unselected thumbnail images.

13. The method according to claim 8, said highlighting said selected thumbnail image comprises at least one of: changing a brightness of said selected thumbnail image; changing a color of said selected thumbnail image; changing a characteristic of a background of said selected thumbnail image; and changing a characteristic of an outline of said selected thumbnail image.

14. The method according to claim 8, further comprising displaying a delete button, an edit button, a rotate button, and a select all button within said movable thumbnail electronic display image, in response to said selection of said selected thumbnail image,
   selection of said delete button deletes said selected thumbnail image from said linear strip of original size thumbnail images within said movable thumbnail electronic display image,
   selection of said edit button presents said selected thumbnail image in an edit screen,
   selection of said rotate button rotates said selected thumbnail image within said linear strip of original size thumbnail images within said movable thumbnail electronic display image, and
   selection of said select all button selects all said selected thumbnail image within said linear strip of original size thumbnail images within said movable thumbnail electronic display image.

15. An apparatus comprising:
   a processor; and
   a display device operatively connected to said processor,
   said display device includes a user input component interacting with screens displayed on said display device,
   said processor providing, a print-menu electronic display image related to printing a document to said display device,
   said print-menu electronic display image has a preview menu option,
   said document comprises document pages in an original page order,
   said processor providing a movable thumbnail electronic display image to said display device, in response to selection of said preview menu option through said user input component,
   said movable thumbnail electronic display image displays a linear strip of original size thumbnail images of said document pages sequentially adjacent one another in said original page order along a dimension of said display device,
   said user input component detecting selection of at least one of said thumbnail images of document pages within said movable thumbnail electronic display image to identify a selected thumbnail image,
   said display device highlighting said selected thumbnail image within said movable thumbnail electronic display image relative to unselected thumbnail images of said document pages, in response to said selection, by changing appearance of said selected thumbnail image without altering the size of said selected thumbnail image,
   said user input component detecting movement of said selected thumbnail image in a first direction perpendicular to, and away from, said unselected thumbnail images within said movable thumbnail electronic display image,
   said display device reducing the size of said unselected thumbnail images relative to said original size within said movable thumbnail electronic display image to leave a linear strip of reduced size unselected thumbnail images, in response to said movement of said selected thumbnail image away from said unselected thumbnail images, without altering the size of said selected thumbnail image,
   said user input component detecting movement of said selected thumbnail image in a second direction parallel to said linear strip of reduced size unselected thumbnail images within said movable thumbnail electronic display image,
   said display device increasing spacing between two adjacent ones of said unselected thumbnail images from an original spacing when said selected thumbnail image is positioned proximate said two adjacent ones of said unselected thumbnail images as said user input component detects movement of said selected thumbnail image in said second direction parallel to said linear strip of reduced size unselected thumbnail images, and returning said spacing between said unselected thumbnail images to said original spacing when said selected thumbnail image is not positioned proximate said unselected thumbnail images, within said movable thumbnail electronic display image, and
   said display device returning said unselected thumbnail images to said original size in response to releasing said selected thumbnail image between said two adjacent ones of said unselected thumbnail images within said movable thumbnail electronic display image, to change said linear strip of original size thumbnail images of said document pages from said original page order to a different order having said selected thumbnail image in a different location within said linear strip.

16. The apparatus according to claim 15, said display device:
   stacking multiple selected thumbnail images as a single unit of stacked images within said movable thumbnail electronic display image, in response to said moving of said selected thumbnail image away from said unselected thumbnail images, when multiple ones of said selected thumbnail images are selected during said selecting; and
   unstacking multiple selected thumbnail images within said movable thumbnail electronic display image, in response to said selected thumbnail image being released, when multiple ones of said selected thumbnail images are selected during said selecting.

17. The apparatus according to claim 16, said display device positioning said single unit of stacked images between said two adjacent ones of said unselected thumbnail images within said movable thumbnail electronic display image, when said selected thumbnail image is positioned between said two adjacent ones of said unselected thumbnail images within said movable thumbnail electronic display image.

18. The apparatus according to claim 15, said display device displaying a linear indicator extending from said selected thumbnail image perpendicular to said linear strip of reduced size unselected thumbnail images within said movable thumbnail electronic display image, in response to said movement of said selected thumbnail image away from said unselected thumbnail images, said linear indicator identifying where said selected thumbnail image is positioned between said two adjacent ones of said unselected thumbnail images.

19. The apparatus according to claim 15, said display device moving said linear strip of reduced size unselected thumbnail images in a third direction, opposite said first direction, within said movable thumbnail electronic display image, in response to said movement of said selected thumbnail image away from said unselected thumbnail images.

20. The apparatus according to claim 15, said highlighting said selected thumbnail image comprises at least one of: changing a brightness of said selected thumbnail image; changing a color of said selected thumbnail image; changing a characteristic of a background of said selected thumbnail image; and changing a characteristic of an outline of said selected thumbnail image.

* * * * *